US009720953B2

(12) United States Patent
Merrill et al.

(10) Patent No.: US 9,720,953 B2
(45) Date of Patent: Aug. 1, 2017

(54) SYSTEMS AND METHODS FOR TYPE COERCION

(71) Applicant: ZestFinance, Inc., Los Angeles, CA (US)

(72) Inventors: John W. L. Merrill, Redmond, WA (US); John J. Beahan, Jr., Pasadena, CA (US)

(73) Assignee: ZestFinance, Inc., Los Angeles, CA (US)

( * ) Notice: Subject to any disclaimer, the term of this patent is extended or adjusted under 35 U.S.C. 154(b) by 0 days.

(21) Appl. No.: 15/187,462

(22) Filed: Jun. 20, 2016

(65) Prior Publication Data

US 2017/0004169 A1 Jan. 5, 2017

Related U.S. Application Data

(60) Provisional application No. 62/325,123, filed on Apr. 20, 2016, provisional application No. 62/187,748, filed on Jul. 1, 2015.

(51) Int. Cl.
*G06F 17/30* (2006.01)

(52) U.S. Cl.
CPC .. *G06F 17/30371* (2013.01); *G06F 17/30569* (2013.01)

(58) Field of Classification Search
None
See application file for complete search history.

(56) References Cited

U.S. PATENT DOCUMENTS

| | | | |
|---|---|---|---|
| 5,999,938 A * | 12/1999 | Bliss | G06F 9/44 |
| 6,877,656 B1 | 4/2005 | Jaros et al. | |
| 7,035,811 B2 | 4/2006 | Gorenstein | |
| 7,280,980 B1 | 10/2007 | Hoadley et al. | |
| 7,542,993 B2 | 6/2009 | Satterfield et al. | |
| 7,711,635 B2 | 5/2010 | Steele et al. | |
| 7,765,151 B1 | 7/2010 | Williams et al. | |
| 7,873,570 B2 | 1/2011 | Cagan et al. | |
| 8,086,523 B1 | 12/2011 | Palmer | |

(Continued)

FOREIGN PATENT DOCUMENTS

| WO | 2014014047 A1 | 1/2014 |
|---|---|---|
| WO | 2015056229 A1 | 4/2015 |

OTHER PUBLICATIONS

Gehrlein, William et al., A two-stage least cost credit scoring model, 1997, Annals of Operations Research, pp. 159-171.

*Primary Examiner* — Belix M Ortiz Ditren
(74) *Attorney, Agent, or Firm* — Jeffrey Schox

(57) ABSTRACT

Systems and methods for converting a data item provided by an external data provider system into a data type specified by a data processing system for a data field of the data item. A data processing system stores a coercion rule for each data field of a first data set provided by the data provider system. Each stored coercion rule identifies at least one data type for the corresponding data field. Responsive to a second data set provided by the data provider system, the data processing system coerces each data item of the second data set into at least one data type specified by the stored coercion rule for the data field of the data item to generate at least one converted data item of the second data set. The data processing system generates information from at least one converted data item, and provides the information to a consuming system.

23 Claims, 26 Drawing Sheets

(56) References Cited

U.S. PATENT DOCUMENTS

| | | |
|---|---|---|
| 8,219,500 B2 | 7/2012 | Galbreath et al. |
| 8,442,886 B1 | 5/2013 | Haggerty et al. |
| 2002/0038277 A1 | 3/2002 | Yuan |
| 2002/0091650 A1 | 7/2002 | Ellis |
| 2002/0178113 A1 | 11/2002 | Clifford et al. |
| 2003/0046223 A1 | 3/2003 | Crawford et al. |
| 2003/0101080 A1 | 5/2003 | Zizzamia et al. |
| 2004/0068509 A1* | 4/2004 | Garden ............ G06F 17/30569 |
| 2004/0107161 A1 | 6/2004 | Tanaka et al. |
| 2005/0055296 A1 | 3/2005 | Hattersley et al. |
| 2005/0278246 A1 | 12/2005 | Friedman et al. |
| 2006/0112039 A1 | 5/2006 | Wang |
| 2007/0016542 A1 | 1/2007 | Rosauer et al. |
| 2007/0106550 A1 | 5/2007 | Umblijs et al. |
| 2007/0112668 A1 | 5/2007 | Celano et al. |
| 2007/0124236 A1 | 5/2007 | Grichnik et al. |
| 2008/0133402 A1 | 6/2008 | Kurian et al. |
| 2008/0208820 A1 | 8/2008 | Usey et al. |
| 2009/0006283 A1* | 1/2009 | Labrie ............... G06F 17/30303 |
| | | 706/12 |
| 2009/0024517 A1 | 1/2009 | Crooks |
| 2009/0037308 A1 | 2/2009 | Feinstein |
| 2009/0192980 A1 | 7/2009 | Beyer et al. |
| 2009/0216748 A1 | 8/2009 | Kravcik |
| 2010/0010878 A1 | 1/2010 | Pinto et al. |
| 2010/0010935 A1 | 1/2010 | Shelton |
| 2011/0078073 A1 | 3/2011 | Annappindi |
| 2011/0112957 A1 | 5/2011 | Ingram et al. |
| 2011/0320423 A1 | 12/2011 | Gemmell et al. |
| 2012/0053951 A1 | 3/2012 | Kowalchuk et al. |
| 2012/0066106 A1 | 3/2012 | Papadimitriou |
| 2012/0066116 A1 | 3/2012 | Kornegay et al. |
| 2012/0072029 A1* | 3/2012 | Persaud ................... G06N 5/04 |
| | | 700/276 |
| 2013/0138553 A1 | 5/2013 | Nikankin et al. |
| 2013/0185189 A1 | 7/2013 | Stewart |
| 2014/0081832 A1 | 3/2014 | Merrill et al. |
| 2014/0172886 A1* | 6/2014 | Wilkes ............. G06F 17/30943 |
| | | 707/755 |

* cited by examiner

Non-Self-Documenting Input Formats

Sample Data Dictionary Entry

701

```
{
    "RecordType" : {
        "type" : "character",
        "begin" : 1,
        "end" : 2
    },
    "ByteCount" : {
        "type" : "integer",
        "begin" : 3,
        "end" : 5
    },
    "RecordIndex" : {
        "type" : "integer",
        "begin" : 6,
        "end" : 8
    },
    "ActivityType" : {
        "type" : "character",
        "begin" : 9,
        "end" : 11
    },
    "Year" : {
        "type" : "integer",
        "begin" : 12,
        "end" : 15
    }
}
```

Sample Data Dictionary Entry

FIGURE 7

Parser construction for a real data dictionary

1201

Credit Report (CR) opaque data record

1202

| Record Type | 1-2 | Character |
|---|---|---|
| Byte Count | 3-5 | Integer |
| Record Index | 6-8 | Integer |
| Zip Code | 9-13 | Integer |
| Credit Score | 14-16 | Integer |

Data Dictionary for a Credit Report (CR) opaque data record

Generated Schema for Credit Report (CR) opaque data record

1204

| Key | Value | Data Type |
|---|---|---|
| Record Type | "CR" | Character |
| Byte Count | 16 | Integer |
| Record Index | 001 | Integer |
| Zip Code | 90272 | Integer |
| Credit Score | 760 | Integer |

Parsed Data for Credit Report (CR) opaque data record

SYSTEMS AND METHODS FOR TYPE COERCION

CROSS-REFERENCE TO RELATED APPLICATIONS

This application claims the benefit of U.S. Provisional Application Ser. No. 62/325,123, filed on 20 Apr. 2016, and U.S. Provisional Application Ser. No. 62/187,748, filed on 1 Jul. 2015, which are incorporated in their entirety by this reference.

TECHNICAL FIELD

This disclosure relates generally to data processing systems, and more specifically to new and useful systems and methods for converting data to be processed by a data processing system.

BACKGROUND

Decision support systems (DSS) are data processing systems that perform data analysis to help users make informed decisions. In general, a DSS retrieves information from a data warehouse, analyzes the information in accordance with user specifications, and publishes the analysis results in a format that users can use to make informed decisions.

BRIEF DESCRIPTION OF THE FIGURES

FIG. 7 is an exemplary schema generated for a data dictionary for a non-self-documenting input format, in accordance with embodiments;

DESCRIPTION OF EMBODIMENTS

1. Overview

During analysis, the data processing system (e.g., a DSS) may perform comparison between one or more data items. In a case where the data items being compared have different data types, the data processing system may convert one or more of the data items to a different data type before performing the comparison (or other data processing operation). The process of automatically converting a data type during a computing operation (e.g., comparison, assignment, arithmetic, or any other computing operation performed on a data item the data processing system) is commonly referred to as type coercion (sometimes referred to herein as "data coercion"). During type coercion, unintended consequences can arise, such as loss of data and loss of precision. Accordingly, during performance of a computing operation by the data processing system, performance of the data processing system can be improved by identifying for each data item of the computing operation a data type into which the data item should be coerced.

Thus, there is a need in the data processing system field to create new and useful systems and methods for pre-processing information retrieved by a data processing system before the data processing system processes data items of the retrieved information. This disclosure provides such new and useful systems and methods.

1.1 Pre-Processing

Pre-processing raw, opaque data (e.g., raw data records provided by a data provider) that includes a plurality of data fields includes using a data parsing module (e.g., in of FIGS. 2A, 2B, 2C) to parse the raw data to identify the data fields of each raw data record (e.g., reduce a record of raw data into a set of data fields).

1.2 Self-Describing Data

Figure 4:
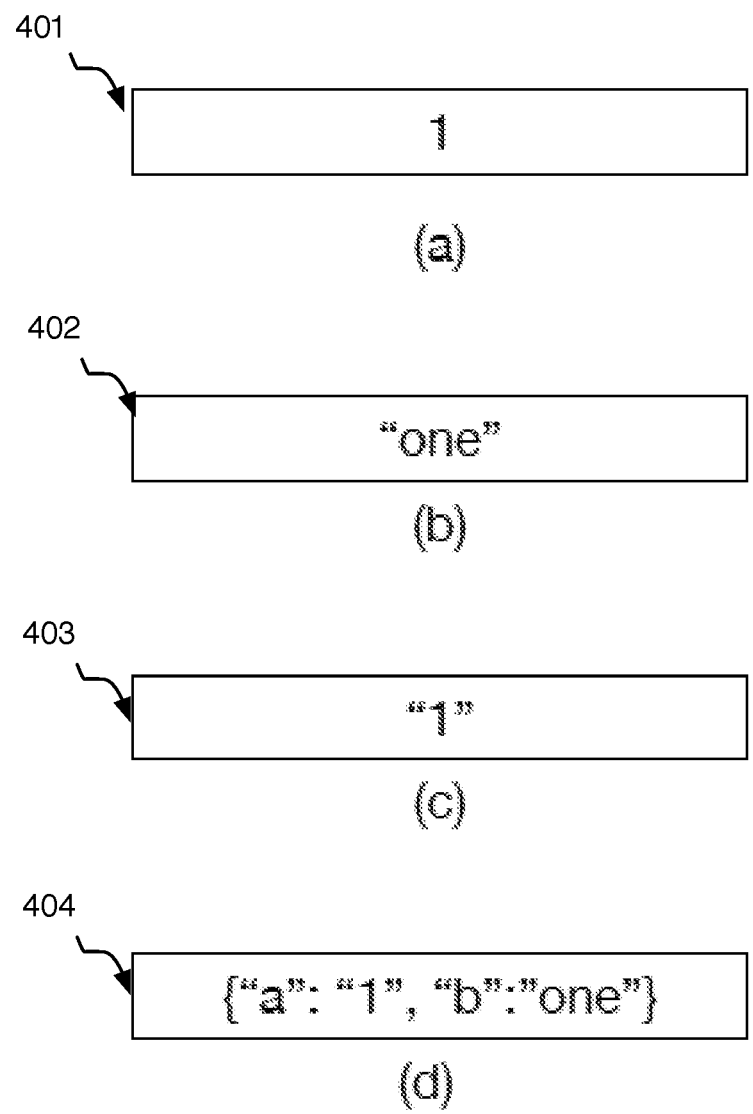
FIG. 4 is a depiction of exemplary self-documenting input formats.

A data provider can provide raw data records as data records having a self-describing data format (e.g., comma-separated value (CSV), XML, etc.) (e.g., data 401-404 of FIG. 4). In a case of raw data having a self-describing data format, a data parsing module can be constructed from the raw data itself. As an example, a CSV record is parsed by splitting the record of raw data at commas. As an example, a JSON blob describes its own structure in a set of key-value pairs. As an example, an XML blob describes its own structure as a nested set of smaller XML elements of atomic data fields.

1.3 Opaque Data

Figure 5:
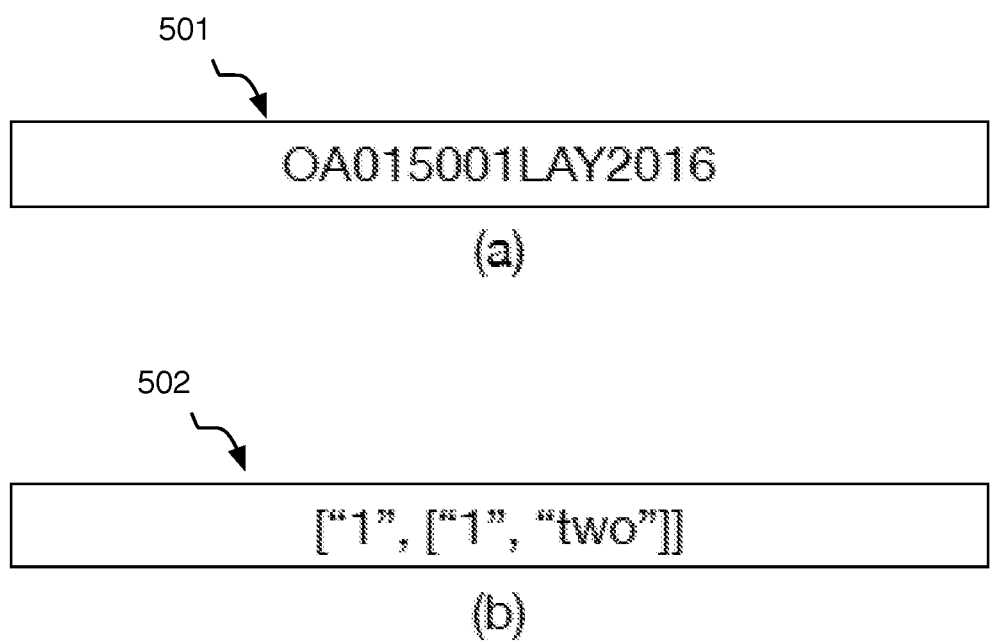
FIG. 5 is a depiction of exemplary non-self-documenting input formats.

A data provider can provide raw data records as opaque data records that do not have a self-describing data format (e.g., data 501 and 502 of FIG. 5). Opaque data records include, for example, data records in a fixed field format (FFR), a raw data stream of opaque bytes, a speech signal, and the like. In a case of opaque raw data records, a data parsing module is constructed outside the raw data record stream itself (in embodiments described herein, a parser generation process is performed to generate the data parsing module (or a sub-module of the data parsing module) that parses opaque data records, and such a parser generation process involves parsing a data dictionary to construct a schema that is used to parse opaque data records received from the data provider). In some embodiments, a structure of the opaque data record is not provided by the record itself. In some embodiments, a structure of the opaque data record is not provided by the record itself, and the data dictionary provides the structure of the opaque data record.

In some arrangements, a data provider system (e.g., a credit reporting agency) can provide a data dictionary (that is associated with the opaque data provided by the data provider system) to a consuming system that consumes the opaque data. Such a data dictionary describes a layout of the opaque data (e.g., which bytes of an opaque record correspond to which fields) along with each element's (or data field's) type. Accordingly, an operator of a consuming system can use a programming language to program a parsing system for the opaque data of the data provider system by using the associated data dictionary. The performance of such a parsing system can be dependent on the accuracy of the data dictionary, the data dictionary capturing all fields (e.g., specifying a data field for each byte of an opaque data record) of opaque data records provided by the data provider system, and the operator properly interpreting the data dictionary. Such a parsing system might not be able to properly parse opaque data if there is a change in the fields of the opaque data (e.g., adding new fields, removing fields, etc.).

In some arrangements, the data dictionary is maintained by humans or some other error-prone system, and the contents of any given data dictionary record may include inaccuracies because the maintaining system initially entered incorrect data or because the data format changed or was updated but the data dictionary was not updated to reflect that change. It is helpful to detect these types of errors during the construction of the parsing system so that they can be remedied.

As an example, an exemplary data dictionary for a financial data source (e.g., one of the systems 131-136) (e.g., a credit reporting agency system) is an 700 page document in the Portable Document Format (ISO 32000-1:2008) (PDF). Many tens of tables (e.g., 70 tables) scattered through this PDF document define the raw data record format of opaque data records. Those tables are obscured within the PDF document by tens of thousands of lines of text that are intended for human consumption but are not used to construct the data parsing module (e.g., 111).

1.3.1 Schema-Based Parsing

Figure 6:
FIG. 6 is a table representing an exemplary data dictionary for a non-self-documenting input format.
Figure 12A:
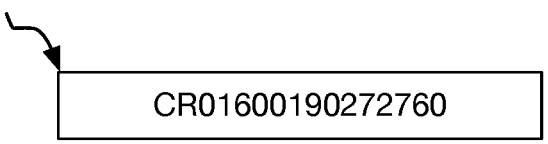
FIG. 12A is a depiction of an exemplary credit report opaque data record.
Figure 12B:
FIG. 12B is a depiction of an exemplary data dictionary for a credit report opaque data record.
Figure 12C:
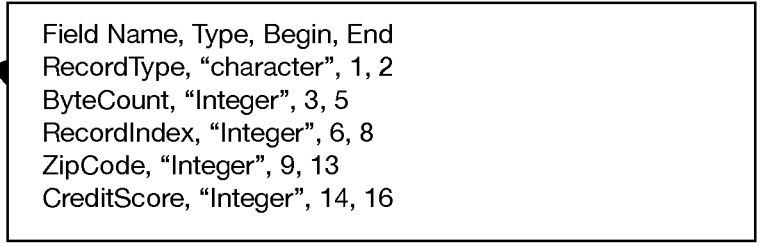
FIG. 12C is a depiction of an exemplary schema generated for a credit report opaque data record, in accordance with embodiments.

In some embodiments, a schema that defines a parsing process for parsing opaque data records of the data provider is generated from a data dictionary of the data provider. Exemplary schemas are depicted in FIGS. 7 and 12C, and a corresponding data dictionary table from which each schema is constructed is depicted in FIGS. 6 and 12B (respectively).

In some implementations, the data dictionary is in a PDF format. In some implementations, information of each data dictionary table of the data dictionary is extracted from the PDF formatted data dictionary, and the extracted information is used to construct a schema corresponding to each data dictionary table, each data dictionary table representing a structure of a different record type provided by the data provider.

This schema is in a computer-readable format, whether stored in memory or in a self-describing file. The schema (file, or other representation of the structure) is included in a system (e.g., 100*a-d*) that consumes the data provided by the data provider system (e.g., 131-136). The schema is different from the opaque data records (e.g., 501 of FIG. 5, the record of FIG. 12A) provided by the data provider system. In other words, during communication of opaque data records from the data provider system to the data consuming system (e.g., 100*a*-100*d*), the schema is not transmitted from the data provider system to the data consuming system.

In some embodiments, an automatic parser generator module receives the schema and generates computer-readable program instructions of the data parsing module (or sub-module of the data parsing module) based on the received schema.

In some embodiments, the schema is provided to a data parsing model, and the data parsing module (e.g., 111) (or sub-module of the data parsing module) parses opaque data provided by the data provider system in accordance with the schema.

In some embodiments, the schema defines a structure of the opaque data records, and the data parsing module parses the opaque data records in accordance with the structure of the schema.

1.3.2 Benefits of Opaque Data

By providing data records as opaque data, a data provider system (e.g., 131-136) may improve data density of the provided data. Reducing the size of raw data records is beneficial in several use cases. As example, in the case of a small, low-power sensor having a small battery (e.g., a sensor that is constructed to monitor the behavior of a pair of nesting California Condors), reducing the size of the raw data may reduce the rate of energy consumption of the small battery. As an example, in the case of an unmanned spacecraft at a great distance from Earth (in which data is communicated between Earth and the spacecraft in a noisy environment), reducing the size of the raw data may improve transmission efficiency. As an example, in the case of a credit report information (e.g., provided by a credit agency, such as Transunion, Experian, Equifax, and the like), reducing the size of the raw data may improve transmission efficiency of the data to a credit report information consuming system.

1.3.3 FFR Format

In embodiments, opaque data includes data in a fixed field format (FFR). An FFR record (or portion of an FFR record) (e.g., 501 of FIG. 5, 1201 of FIG. 12A) contains a byte length field, a field indicating the type of the record, and then the data in that record as a single un-delimited string of bytes. In embodiments, a data provider (e.g., one of the data provider systems 131-136 of FIGS. 1A-1D) emits many different types of FFR records. The FFR data format is used to improve data compactness because the FFR format does not utilize delimiters or other types of embedded parsing cues that are embedded in the raw data record itself, thereby adding extra padding to the record.

1.3.4 Parsing Opaque Data for Specific Fields

Parsing opaque data for data of a specific field can be performed based on a predetermined field identifier.

For example, data representing a credit score (e.g., a FICO score) can be identified from within a stream of bytes by performing a pattern matching process to identify a byte string that identifies credit score data. If a credit score is transmitted in the opaque data as 15 header bytes (e.g., "A00101190029298") followed by a 3 byte credit score (e.g., "650"), the credit score can be identified by searching for the header string and extracting the following three bytes as the credit score, provided that the header string is known in advance. In this manner, in a case where the credit score is included in an opaque data record that contains additional information (e.g., social security number, name, address, credit score, etc.), the pattern matching process can be used to identify the credit from such a data record even if the format of the data record is not known. In other words, a parser that is constructed to extract a credit score (or other data based on pattern matching using a known header identifier) might not be able to extract the additional information of the opaque data record. Furthermore, the opaque data might not include headers for each data field. Therefore, a pattern matching process might not extract all data of each data record of opaque data provided by a data provider.

1.3.5 Parsing Opaque Data to Identify and Use Data of Each Field of Each Opaque Data Record.

Embodiments herein for extracting data of each field of each record of opaque data involve use of a data dictionary (e.g., 1202 of FIG. 12B) that defines each opaque data record type as a string of bytes having a specified length, and that identifies which bytes of the string of bytes correspond to which data field. In some embodiments, the data dictionary identifies a data type for each data field. In some embodiments, a predetermined number of bytes starting with the first byte (e.g., first 2 bytes, first 4 bytes, etc.) of each record identify the record type of the opaque data record. In other words, the data dictionary defines the structure of each opaque data record. By converting the data dictionary (e.g., 1202 of FIG. 12B) into a structured schema (e.g., 1203 of FIG. 12C), and by performing parsing of opaque data records (e.g., 1204 of FIG. 12D) provided by the data provider (e.g., a credit agency system) in accordance with the structure defined by the schema, parsed data of each record of each opaque data record can be assigned to a particular field name (or variable name, or key name) as defined by the schema (and in some embodiments, assigned a computer data type as defined by the schema).

As described herein, a data dictionary (e.g., 1202 of FIG. 12B) provided by a data provider system might not be accurate. Accordingly, parsing opaque data can be improved by validating the data dictionary before generating the schema from the data dictionary.

Embodiments of this disclosure include systems and methods for parsing opaque data records to identify each data field of each opaque data record.

2. Summary of Embodiments

In some embodiments, a PDF document includes a data dictionary of a data provider system, and the data dictionary is represented in the PDF document as one or more tables (e.g., 601 of FIG. 6, 1202 of FIG. 12B) having a predetermined format. Each table defines at least one record format (e.g., credit report record format) of opaque raw data records (e.g., 501 of FIG. 5, 1201 of FIG. 12A) provided by the data provider system (e.g., a credit agency system). The record format defines data fields of at least one opaque raw data record. In some embodiments, tables of the data dictionary (e.g., 601 of FIG. 6, 1202 of FIG. 12B) are extracted from the PDF document, and the tables of the data dictionary are converted into at least one computer-readable data file (e.g., a CSV file).

Validity criteria are applied to each of the at least one computer-readable data files to generate at least one validated computer-readable data file.

A parser schema (e.g., 701 of FIG. 7, 1203 of FIG. 12C) is generated from the at least one validated computer-readable data file. In some embodiments, the generated parser schema is provided to an automatic parser generator module that generates computer-readable program instructions of the data parsing module based on the generated parser schema. In some embodiments, the generated parser schema is provided to a data parsing module (e.g., in) that parses opaque data records in accordance with a structure defined by the generated parser schema.

In some embodiments, an Optical Character Recognition (OCR) parser is used to extract the tables of the data dictionary. In some embodiments, the Tabula application (e.g., the Tabula application found at http://tabula.technology/ or https://github.com/tabulapdf/tabula) is used to extract the tables of the data dictionary. Tabula is an open source package which reads a PDF document and an indication of the location of a table within the PDF document and generates a file reflecting the indicated table. In some embodiments, each table extracted as a CSV file.

In some embodiments, the generated parsing schema is used by a data parsing module (e.g., the data parsing module 111) to parse opaque raw data records provided by the data provider system to identify a plurality of data fields included in the opaque raw data records, and provide the plurality of data fields (e.g., key-value pairs, Ruby hash, JSON blob representing a set of key-value pairs, and the like) to at least one data processing engine (e.g., a decisioning engine) that is constructed to generate information (e.g., decision information) based on the plurality of data fields. The data parsing module is constructed to identify data fields in accordance with the record format indicated by the generated parser schema. In some embodiments, the opaque raw data records have an FFR format and the tables define the FFR record format of opaque raw data records.

In some implementations, key-value pairs are represented by a Ruby hash (e.g., a hash as defined by the Ruby programming language). In some implementations, key-value pairs are represented by a JSON (JavaScript Object Notation) blob. In some implementations, the representation of a set of key-value pairs is a JSON blob constructed by using the Python JSON module. In some implementations, a JSON blob representing each set of key-value pairs is generated directly from a Ruby hash.

In some embodiments, tables of the PDF document define the FFR record format of opaque data records provided by the data provider system. In some embodiments, each opaque data record (e.g., FIG. 501 of FIG. 5, 1201 of FIG. 12A) has: a byte length field, a field indicating the type of the record, and the data in that record as a single undelimited string. In some embodiments, each data dictionary table (e.g., 601 of FIG. 6, 1202 of FIG. 12B) of the PDF document is a human-readable table in the PDF format that defines at least one type of opaque data record of the data provider system by specifying which bytes of the record correspond to the byte length field, the type field, and each data field.

As the PDF document is typically maintained by a human, the document can contain errors. Any of the tables might be incorrectly formatted for any of several reasons: the field registration data might not be internally consistent, or the length of the record might not be the correct length, or the headers in the table might be wrong, or other similar issues. Accordingly, performing validation to detect such errors can improve accuracy of the process of parsing the opaque data records.

In some embodiments, the PDF document is provided by the data provider system (e.g., a credit agency system). In some embodiments, the PDF document is provided by a system external to the data provider system. In some embodiments, the PDF document is generated by the data provider system (e.g., the credit agency system). In some embodiments, the PDF document is generated by a system external to the data provider system. In some embodiments, the PDF document includes the data dictionary and additional information to be presented by a human presentation device, such as, for example, a display device, a printing device, and the like. In some embodiments, the additional information is intended for human consumption. In some embodiments, the additional information is different from the data dictionary. In some embodiments, the additional information is different from information used to parse opaque raw data records.

In some embodiments, methods disclosed herein are performed by the data processing system (e.g., 100a, 100b, 100c, 100d) (e.g., a decisioning system). In some embodiments, methods disclosed herein are performed by a modeling client system (e.g., 141a-141d). In some embodiments, methods disclosed herein are performed by an entity system (e.g., 151b-153b, 151c, 151d-153d). In some embodiments, methods disclosed herein are performed by a data provider system (e.g., 131-136). In some embodiments, methods disclosed herein are performed by a decision information consuming system (e.g., 121a, 121b-123b, 121C, 121d-123d).

Embodiments of this disclosure include: 1) single-tenant data processing systems (e.g., the system 100a of FIG. 1A), 2) multi-tenant data processing systems (e.g., the system 100b of FIG. 1B), 3) single tenant data processing platform systems (e.g., the system 100c of FIG. 1C), and 4) multi-tenant data processing platform systems (e.g., the system 100d of FIG. 1D), and methods corresponding to the disclosed systems. In some embodiments, the data processing systems is a decisioning system. In some embodiments, the data processing platform system is a decisioning system.

In some embodiments, such data processing systems (e.g., the systems 100a-100d) are constructed to process input data (e.g., provided by a data provider system, such as one or more of the systems 131-136) to generate information (e.g., decision information). In some embodiments, the information is decision information. In some embodiments, such data processing systems (e.g., the systems 100a-100d) are constructed to process input data (e.g., provided by a data provider system, such as one or more of the systems 131-136) to generate information (e.g., decision information) responsive to a request provided by a consuming system (e.g., 121a, 121b-123b, 121C, 121d-123d). In some embodiments, the data processing systems are constructed to provide information (e.g., decision information) to a human user (e.g., operating one of the systems 121a, 151b-153b, 151c, 151d-153d) to aid the user in making an informed decision. In some embodiments, data processing systems are constructed to provide information (e.g., decision information) to a least one system (e.g., one of the systems 121a, 151b-153b, 151c, 151d-153d) that is constructed to perform at least one automated action responsive to information (e.g., decision information). In some embodiments, data processing systems (e.g., the systems 100a-100d) are constructed to provide information (e.g., decision information) to a consuming system (e.g., one of the systems 121a, 121b-123b, 121C, 121d-123d) in response to a request for information (e.g., decision information) provided by the consuming system. In some embodiments, the consuming system provides input data with the request for information (e.g., decision information). In some embodiments, the consuming system is a consuming system of a lending system, and the input data provided with the request for information (e.g., decision information) is borrower data received from a loan applicant, and the request for information is a request to the data processing system to provide information that indicates whether to lend money to the borrower. In some embodiments, data processing systems (e.g., the systems 100a-100d) include predictive analysis systems that use at least one predictive analytic model to generate information (e.g., decision information). In some embodiments, data processing systems (e.g., the systems 100a-100d) include Decision Support Systems (DSS).

Single-Tenant Systems

Figure 1A:
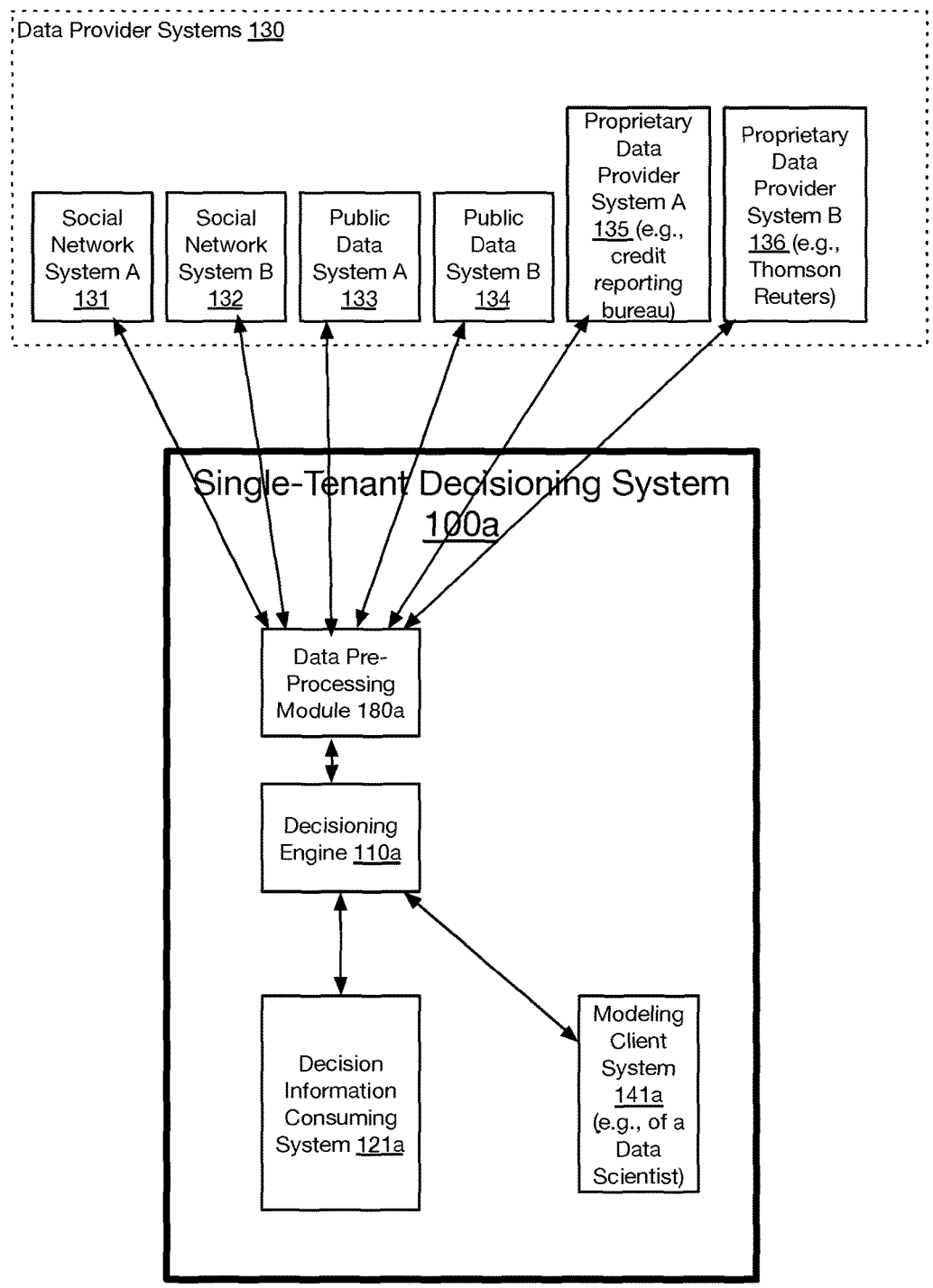
FIG. 1A is a schematic representation of a single-tenant data processing system in accordance with embodiments.
Figure 1B:
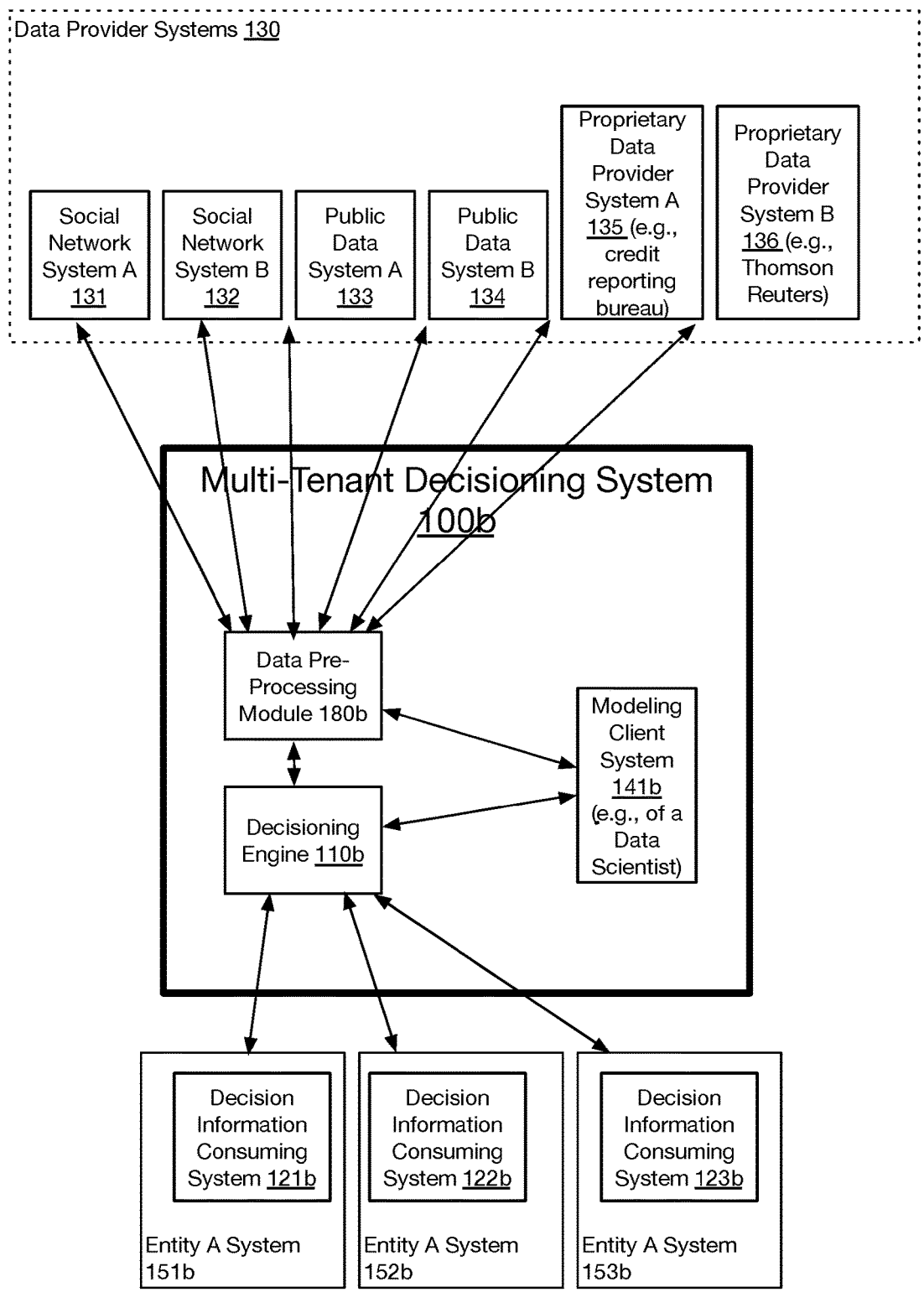
FIG. 1B is a schematic representation of a multi-tenant data processing system in accordance with embodiments.
Figure 1C:
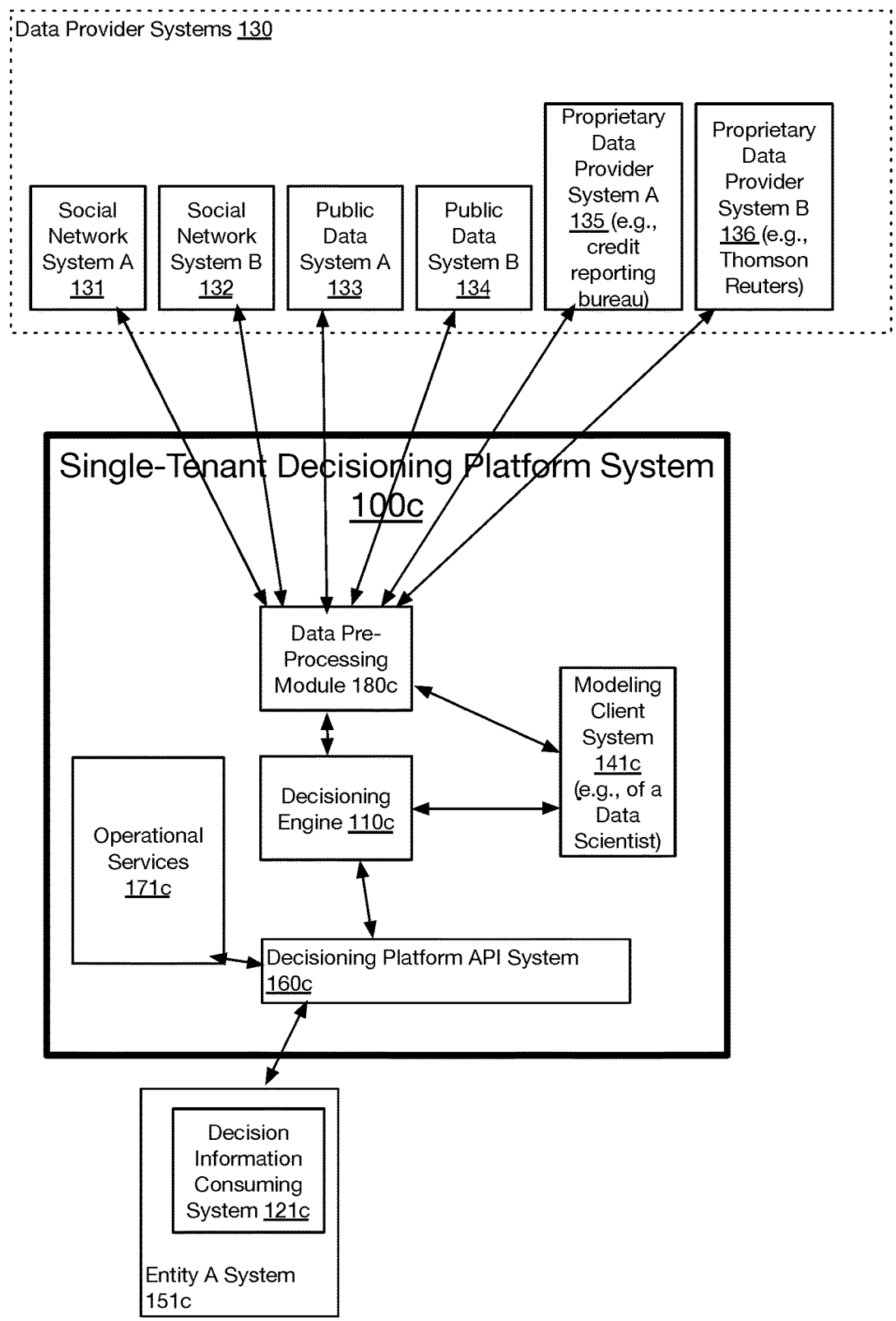
FIG. 1C is a schematic representation of a single-tenant data processing platform system in accordance with embodiments.

In some embodiments, the system is a single-tenant system (a single tenant decisioning system bow of FIG. 1A, a single-tenant decisioning system platform 100c of FIG. 1C). In some embodiments, the single-tenant system provides decision information to one decision information consuming system (e.g., 121a, 121c). In some embodiments, the decision information consuming system (e.g., 121a) is internal to the single-tenant system. In some embodiments, the decision information consuming system (e.g., 121c) is external to the single-tenant system.

Multi-Tenant Systems

Figure 1D:
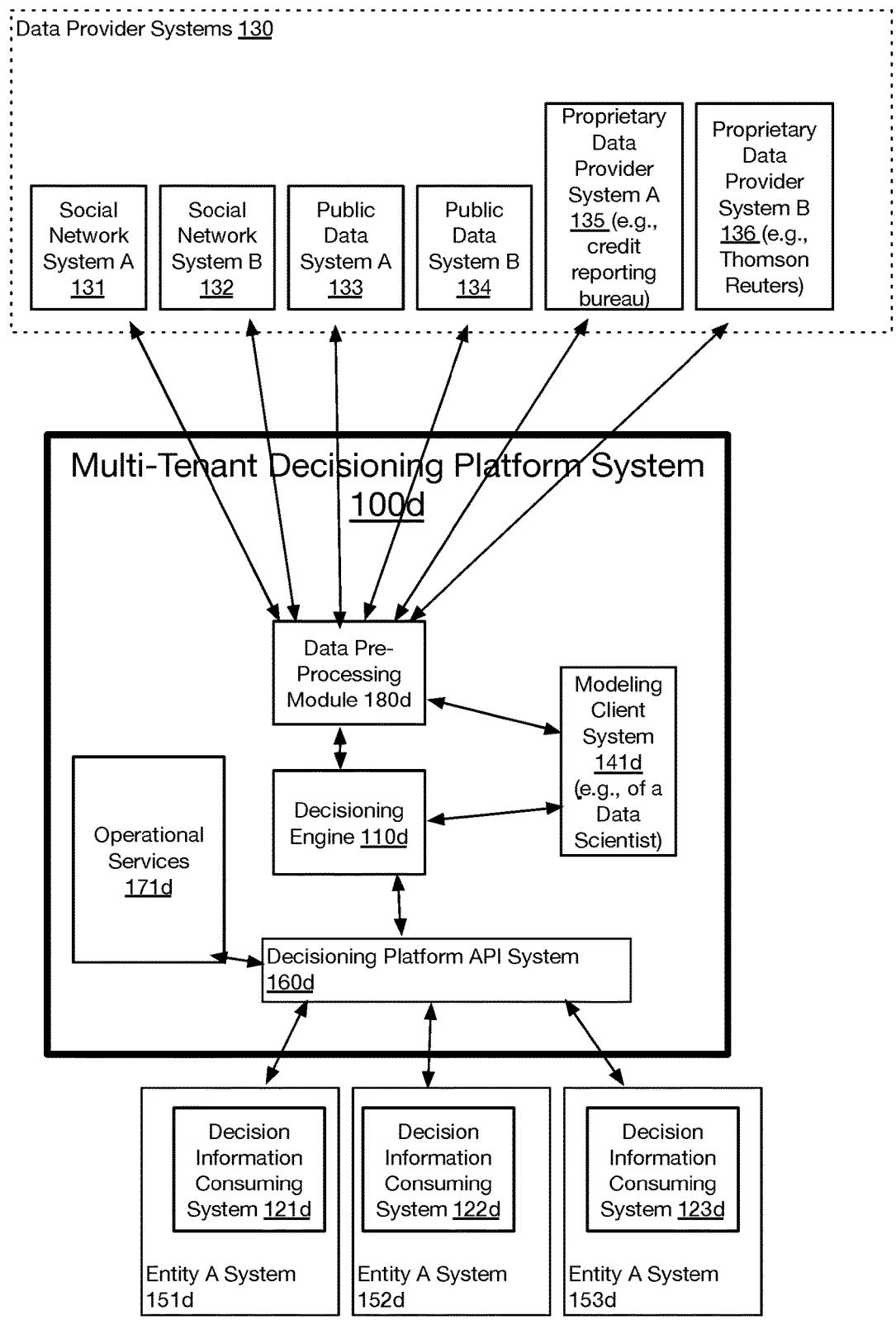
FIG. 1D is a schematic representation of a multi-tenant data processing platform system in accordance with embodiments.

In some embodiments, the decisioning system is a multi-tenant system (a multi-tenant decisioning system 100b of FIG. 1B, a multi-tenant decisioning system platform 100d of FIG. 1D). In some embodiments, the multi-tenant system provides decision information to a plurality of decision information consuming systems (e.g. 121b-123b, 121d-123d). In some embodiments, the decision information consuming systems include at least one decision information consuming system that is internal to the multi-tenant system. In some embodiments, the decision information consuming systems include at least one decision information consuming system that is external to the multi-tenant system (e.g. 121b-123b, 121d-123d). In some embodiments, each consuming system is a system of an entity (e.g., multi-tenant system account holder, multi-tenant system sub-account holder) of the multi-tenant decisioning system (e.g. 121b-123b, 121d-123d).

System Architecture:

In some embodiments, the decisioning system (e.g., one of the systems 100a-100d) includes at least one input data pre-processing module (e.g., 180a, 180b, 180c, 180d) and at least one decisioning engine (e.g., 110a-d).

System Architecture: Input Data Pre-Processing Modules

In some embodiments, each input data pre-processing module (e.g., 180a, 180b, 180c, 180d) is constructed to pre-process data retrieved by the decisioning system (e.g., 100a, 100b, 100c, 100d) from a respective data provider system (e.g., 131-136) and provide the pre-processed data to at least one decisioning engine (e.g., 110a-d) to generate decision information. In some embodiments, the decisioning system includes one input data pre-processing module (e.g., 180a, 180b, 180c, 180d) that includes a sub-module for at least one data provider system (e.g., 131-136), and each sub-module is constructed to pre-process data retrieved by the decisioning system (e.g., 100a, 100b, 100c, 100d) from a respective data provider system (e.g., 131-136) and provide the pre-processed data to at least one decisioning engine (e.g., 110a-d) to generate decision information.

Figure 2A:
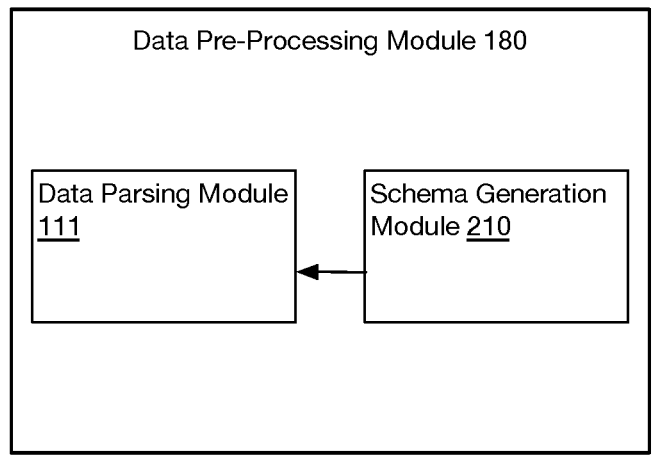
FIG. 2A is a schematic representation of data pre-processing module in accordance with embodiments.

In some embodiments, at least one input data pre-processing module includes a data parsing module (e.g., the data parsing module 111 of FIG. 2A). In some embodiments, the decisioning system includes one input data pre-processing module that includes a data parsing module (e.g., the data parsing module 111 of FIG. 2A), and the data parsing module includes a sub-module for at least one data provider system (e.g., 131-136), and each sub-module is constructed to parse data retrieved by the decisioning system (e.g., 100a, 1100b, 100c, 100d) from a respective data provider system (e.g., 131-136) and provide the parsed data to at least one decisioning engine (e.g., 110a-d).

Figure 2B:
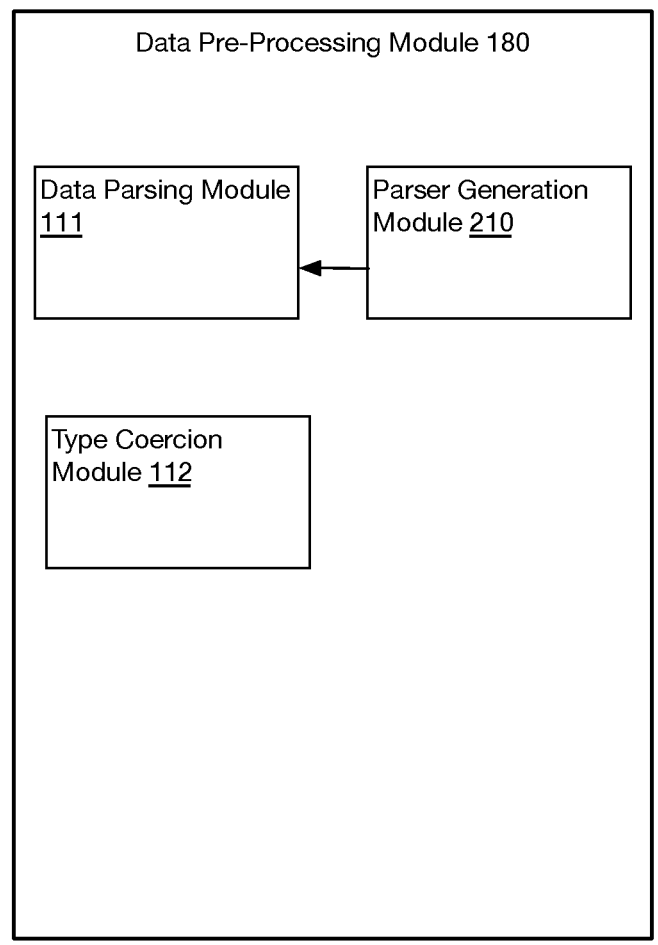
FIG. 2B is a schematic representation of data pre-processing module in accordance with embodiments.
Figure 2C:
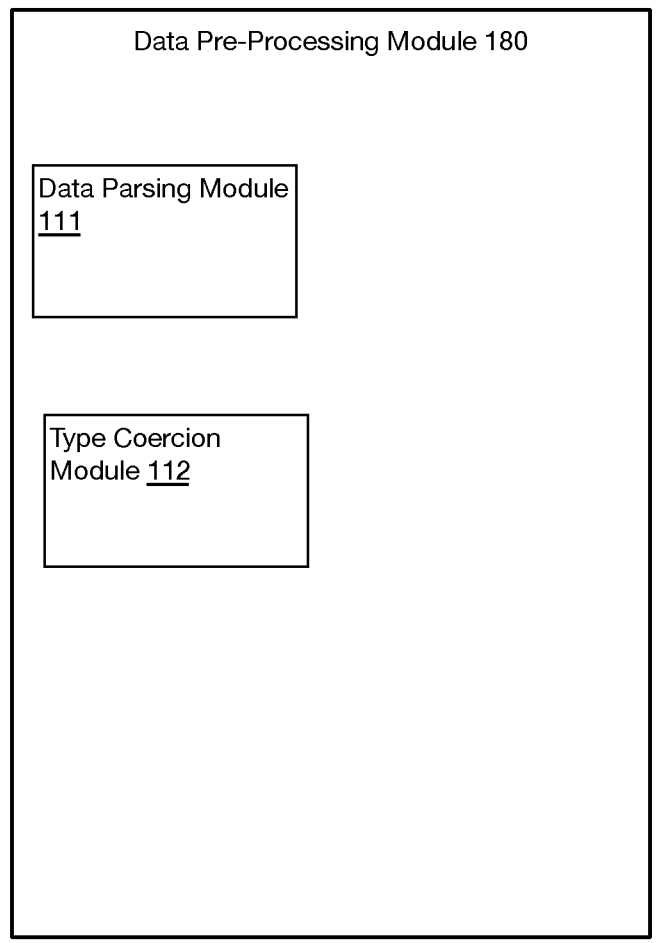
FIG. 2C is a schematic representation of data pre-processing module in accordance with embodiments.
Figure 3:
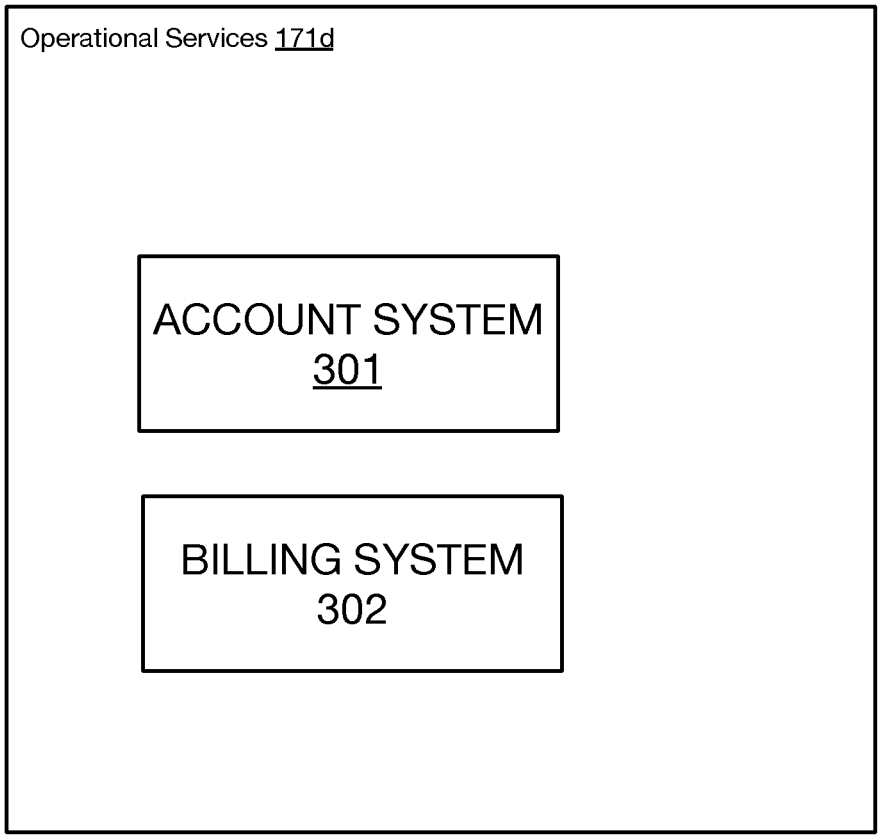
FIG. 3 is a schematic representation of an operational services system in accordance with embodiments.

In some embodiments, at least one input data pre-processing module includes a type coercion module, sometimes referred to herein as a type coercion module, (e.g., the type coercion module 112 of FIGS. 2B, 2C). In some embodiments, at least one input data pre-processing module is generated based on information provided by a data modelling client system (e.g., 141a-d of FIGS. 1A-1D, respectively). In some embodiments, the decisioning system includes one input data pre-processing module that includes a type coercion module (e.g., the type coercion module 112 of FIGS. 2B, 2C), and the type coercion module includes a sub-module for at least one data provider system, and each sub-module is constructed to coerce data retrieved by the decisioning system from a respective data provider system and provide the coerced data to at least one decisioning engine (e.g., 110a-d).

In some embodiments, at least one input data pre-processing module is generated based on information provided by a data modelling client system (e.g., 141a-d of FIGS. 1A-1D, respectively). In some implementations, the data modelling client system is operated by a human that performs the role of data modeler or data scientist. In some embodiments, the decisioning system (e.g., 100a, 100b, 100c, 100d) includes at least one input data pre-processing module (e.g., in) for at least one data provider system (e.g., 131-136) used by the decisioning system (e.g., 100a, 100b, 100c, 100d).

In some embodiments, at least one input data pre-processing module (e.g., 180a-d) includes a schema generation module (e.g., 210 of FIGS. 2A and 2B) that is constructed to generate the data parsing module (e.g., the data parsing module 111 of FIGS. 2A and 2B).

In some embodiments, the decisioning system includes one input data pre-processing module that includes a schema generation module (e.g., 210 of FIGS. 2A and 2B), and the schema generation module includes a sub-module for at least one data provider system, and each sub-module is constructed to generate a data parsing module (e.g., the data parsing module 111 of FIGS. 2A and 2B) for the respective data provider system.

In some embodiments, the decisioning system includes one input data pre-processing module that includes a schema generation module (e.g., 210 of FIGS. 2A and 2B), and the schema generation module includes a sub-module for a plurality of data provider systems, and each sub-module is constructed to generate a data parsing schema for the respective data provider system and provide the generated schema to the data parsing sub-module (e.g., a sub-module of 111) for the respective data provider system.

In some embodiments, the schema generation module 210 includes a schema generation sub-module for schema generation for at least one data provider system (e.g., a credit agency system). In some embodiments, the schema generation module 210 includes plurality of schema generation sub-modules, each sub-module constructed for schema generation for a respective data provider system. In some embodiments, the data parsing module 111 includes a parsing sub-module for parsing for each data provider system. In some embodiments, the data parsing module 111 includes a parsing sub-module for parsing for at least one data provider system. In some embodiments, the data parsing module 111 includes a parsing sub-module for parsing for a plurality of data provider systems.

System Architecture: Data Parsing Module

In some embodiments, the type coercion module 112 (FIGS. 2B, 2C) is communicatively coupled to the data parsing module 111.

The data parsing module 111 is constructed to receive a first data set (e.g., input corpus, original data corpus) provided by an external data provider (e.g., one of 131-136), and parse the first data set provided by the external data provider to identify each data field of each record of the first data set. In some embodiments, the first data set is a training data set. The first data set is data that is used by the decisioning system to generate at least one coercion rule. The data parsing module 111 provides the type coercion module 112 with a set of parsed first data set records, each first data set record including a set of data fields. In some implementations, a first data set record includes a data item for each data field of the first data set record. In some implementations, a first data set record includes for each data field of the first data set record either a data item or a marker that indicates that a data item is not available for the data field (e.g., a not available (NA) value). In some implementations, each data set record includes a record identifier (ID) and a list of (field identifier (ID), data item) pairs (e.g., {(<training recordID A>, {(<field 1>, <record A data item 1>), (<field 2>, <record A data item 2>), . . . (<field N>, <record A data item N>)}), (<training recordID B>, {(<field 1>, record B data item 1>), (<field 2>, <record B data item 2>), . . . (<field N>, <record B data item N>)})}).

System Architecture: Type Coercion Module—Coercion Overview

The type coercion module 112 is constructed to receive the set of parsed first data set records provided by the data parsing module 111. For each data field (e.g., <field 1>, <field 2>, <field N>) of the set of parsed first data set records (e.g., Record ID A, Record ID B) received from the data parsing module 111, the type coercion module 112 is constructed to store a coercion rule. Embodiments herein include at least embodiments in which each coercion rule specifies a single default data type, embodiments in which each coercion rule specifies a plurality of data types including a default data type, and embodiments in which each coercion rule specifies a plurality of data types none of which is identified as a default data type. In some embodiments, each coercion rule specifies a plurality of data types, and a default data type is determined during generation of the coercion rule. In some embodiments, each coercion rule specifies a plurality of data types, and a default type is generated during coercion of a data item. The disclosure herein describes processes for determining a default data type, and these processes can be used to determine a default data type during generation of a coercion rule and during coercion of a data item. In some implementations, the type coercion module determines default data types for coercion rules. In some implementations, the decisioning engine determines default data types for coercion rules. In some implementations, the type coercion module performs type coercion. In some implementations, the decisioning engine performs type coercion. In some implementations, the type coercion module uses a distributed storage and distributed processing (DSDP) cluster to generate at least one coercion rule. In some implementations, the DSDP cluster is included in the type coercion module. In some implementations, the DSDP cluster is included in the decisioning system. In some implementations, the decisioning system determines each default data type by using at least one of arithmetic operations and bitwise logical operations of at least one arithmetic logic unit (ALU) (e.g., an ALU of processing unit 999 of FIG. 9, an ALU of processing unit 1699 of FIG. 16) of the decisioning system that supports a SIMD (Single Instruction Multiple Data) system that provides native support for multiply and accumulate operations. In some implementations, the decisioning system determines a default data type for at least one data field and coerces at least one data item for the data field into the default data type automatically without human intervention. In some embodiments, the decisioning system determines default data types by performing accumulate, multiply, log and floor operations. By virtue of using accumulate, multiply, log and floor operations instead of more complex operations not natively supported by hardware of an arithmetic logic unit (ALU) of the decisioning system that supports a SIMD (Single Instruction Multiple Data) system that provides native support for multiply and accumulate operations, such an ALU can be used to determine default data types. In other words, native hardware operations can be used to improve performance.

System Architecture: Type Coercion Module: Coercion Rules Specifying Default Type In some embodiments, each coercion rule specifies a single default data type. In some implementations, the coercion rule includes a data type identifier that identifies the default data type. In some implementations, each stored coercion rule (e.g., (<field 1>, "Integer Date") specifies a data type identifier (e.g., one of "String", "Double", "Bool", "Integer", "Integer Date") for a default data type for the corresponding data field (e.g., one of <field 1>, <field 2>, <field N>).

System Architecture: Type Coercion Module: Coercion Rules Specifying a Plurality of Data Types In some embodiments, each coercion rule specifies a plurality of data types. In some embodiments, each coercion rule specifies a plurality of data types, one of which is identified as a default data type. In some implementations, each stored coercion rule specifies a plurality of data type identifiers for the corresponding data field. In some implementations, the plurality of data type identifiers are ordered in accordance with increasing strength of the corresponding data type, wherein a first data type is stronger than a second data type if the first data type is coercible into the second data type. In some implementations, the plurality of data type identifiers are ordered in accordance with decreasing strength of the corresponding data type.

In some implementations, each stored coercion rule specifies a plurality of data type coercion values for the corresponding data field. In some implementations each data type coercion value for a data field indicates whether data items of the data field are coercible into a corresponding data type of the plurality of data types of the data processing system (e.g., the decisioning system). In some implementations, the plurality of data type coercion values are ordered in accordance with increasing strength of the corresponding data type. In some implementations, the plurality of data type coercion values are ordered in accordance with decreasing strength of the corresponding data type.

System Architecture: Coercion

The data parsing module 111 is constructed to receive a second data set data provided by the external data provider (e.g., one of 131-136) that provides the first data set, and to parse the second data set data provided by the external data provider to identify each data field of each record of second data set. In some embodiments, the second data set is a data set of input data. In some embodiments, the input data is decisioning input data. In some implementations, the data parsing module 111 provides the type coercion module 112 with a set of parsed data records of the second data set, each data record of the second data set including a set of data fields. In some implementations, a second data set data record includes a data item for each data field of the second data set record. In some implementations, a second data set record includes for each data field of the input data record either a data item or a marker that indicates that a data item is not available for the data field (e.g., a not available (NA) value). In some implementations, each data record includes a record identifier (recordID) and a list of (field identifier (ID), data item) pairs (e.g., {(<decisioning input recordID A>, {(<field 1>, <record A data item 1>), (<field 2>, <record A data item 2>), . . . (<field N>, <record A data item N>)}), (<decisioning input recordID B>, {(<field 1>, <record B data item 1>), (<field 2>, <record B data item 2>), . . . (<field N>, <record B data item N>)})}).

The type coercion module 112 is constructed to receive the set of parsed second data set records provided by the data parsing module 111.

System Architecture: Coercion by the Type Coercion Module

In some embodiments, for each data item (e.g., data items 1, 2 and N of the decisioning input recordID A, and data items 1, 2 and N of the decisioning input recordID B), the type coercion module 112 is constructed to coerce the second data set data item. In some implementations, in a case where each coercion rule specifies a default data type, the type coercion module 112 is constructed to coerce the second set data item into the default data type specified by the stored coercion rule for the data field of the second data set data item to generate a converted second data set data item. For example, if the following coercion rule (<field 1>, "Integer Date") is stored for <field 1>, then data item 1 of the decisioning input recordID A and data item 1 of the decisioning input recordID B are each coerced into an "Integer Date" data type.

In some implementations, in a case where each coercion rule specifies a plurality of data types, the type coercion module 112 is constructed to coerce the second set data item into a default data type by using the stored coercion rule for the data field of the second data set data item to generate a converted second data set data item. In some implementations, in a case where each coercion rule specifies a plurality of data types, the type coercion module 112 is constructed to coerce the second set data item into a plurality of data types by using the stored coercion rule for the data field of the second data set data item to generate a plurality of converted second data set data items. In some implementations, the plurality of converted data items include a data item of a default data type determined by the type coercion module by using the coercion rule for the data field. In a case where a stored coercion rule does not specify a default data type, the type coercion module uses the coercion rule to determine a default data type during coercion, as described herein.

In some embodiments, the type coercion module 112 is constructed to provide each converted data item to the decisioning engine (e.g., 110*a-d* of FIGS. 1A-1D). The decisioning engine is constructed to generate information (e.g., decision information, such as, for example, a credit score) from at least one converted data item provided by the type coercion module 112, and provide the generated information to a consuming system (e.g., 121a, 121b, 122b, 123b, 121C, 121d, 122d, 123d).

System Architecture: Coercion by the Decisoining Engine

In some implementations, the data parsing module 111 provides the decisioning engine with the set of parsed second data set data records, and the type coercion module 112 provides the decisioning engine with the stored coercion rules, and for each data item, the decisioning engine is constructed to coerce the second data set data item.

In some implementations, in a case where each coercion rule specifies a default data type, the decisioning engine is constructed to coerce the second set data item into the default data type specified by the stored coercion rule for the data field of the second data set data item to generate a converted second data set data item. For example, if the following coercion rule (<field 1>, "Integer Date") is stored for <field 1>, then data item 1 of the decisioning input recordID A and data item 1 of the decisioning input recordID B are each coerced into an "Integer Date" data type.

In some implementations, in a case where each coercion rule specifies a plurality of data types, the decisioning engine is constructed to coerce the second set data item into a default data type by using the stored coercion rule for the data field of the second data set data item to generate a converted second data set data item. In some implementations, in a case where each coercion rule specifies a plurality of data types, the decisioning engine is constructed to coerce the second set data item into a plurality of data types by using the stored coercion rule for the data field of the second data set data item to generate a plurality of converted second data set data items. In some implementations, the plurality of converted data items include a data item of a default data type determined by the decisioning engine by using the coercion rule for the data field. In a case where a stored coercion rule does not specify a default data type, the decisioning engine uses the coercion rule to determine a default data type during coercion, as described herein. In some embodiments, in a case where a stored coercion rule does not specify a default data type, the decisioning engine performs coercion without determining a default data type.

The decisioning engine is constructed to generate information (e.g., decision information, such as, for example, a credit score) from at least one converted data item provided by the type coercion module 112, and provide the generated information to a consuming system (e.g., 121a, 121b, 122b, 123b, 121C, 121d, 122d, 123d).

System Architecture: Cluster

In some embodiments, the type coercion module 112 generates each coercion rule, as described herein. In some embodiments, the type coercion module 112 performs type coercion, as described herein. In some embodiments, the type coercion module 112 generates each coercion rule during a first process (rule generation process) and performs type coercion during a second process (type coercion process) by using at least one coercion rule generated during the rule generation process.

In some implementations, the type coercion module 112 uses a distributed storage and distributed processing (DSDP) cluster (e.g., the cluster 1500 of FIG. 15) to generate at least one coercion rule during the rule generation process. In some implementations, the DSDP cluster 1500 is included in the type coercion module 112. In some implementations, the DSDP cluster 1500 is external to type coercion module 112 and communicatively coupled the type coercion module 112.

In some implementations, the DSDP cluster 1500 is included in the data processing system (e.g., 100a, 100b, 100c, 100d). In some implementations, the DSDP cluster 1500 is external to the data processing system (e.g., 100a, 100b, 100c, 100d).

In some implementations, the DSDP cluster 1500 is a MapReduce cluster. In some implementations, the DSDP cluster 1500 is implemented by a server device (e.g., the server device 1600 of FIG. 16). In some implementations, the DSDP cluster 1500 is implemented by a plurality of devices (e.g., the server device 1600 of FIG. 16).

In some implementations, the DSDP cluster includes at least one mapping system, a DSDP framework system, and at least one reducing system. In some implementations, the cluster includes a plurality of mapping systems. In some implementations, the cluster includes a plurality of reducing systems. In some implementations, each mapping system is a virtual machine. In some implementations, each mapping system is a hardware machine. In some implementations, at least one mapping system is a virtual machine. In some implementations, at least one mapping system is a hardware machine.

In some implementations, each reducing system is a virtual machine. In some implementations, each reducing system is a hardware machine. In some implementations, at least one reducing system is a virtual machine. In some implementations, at least one reducing system is a hardware machine.

In some implementations, the framework system is a virtual machine. In some implementations, the framework system is a hardware machine.

Figure 16:
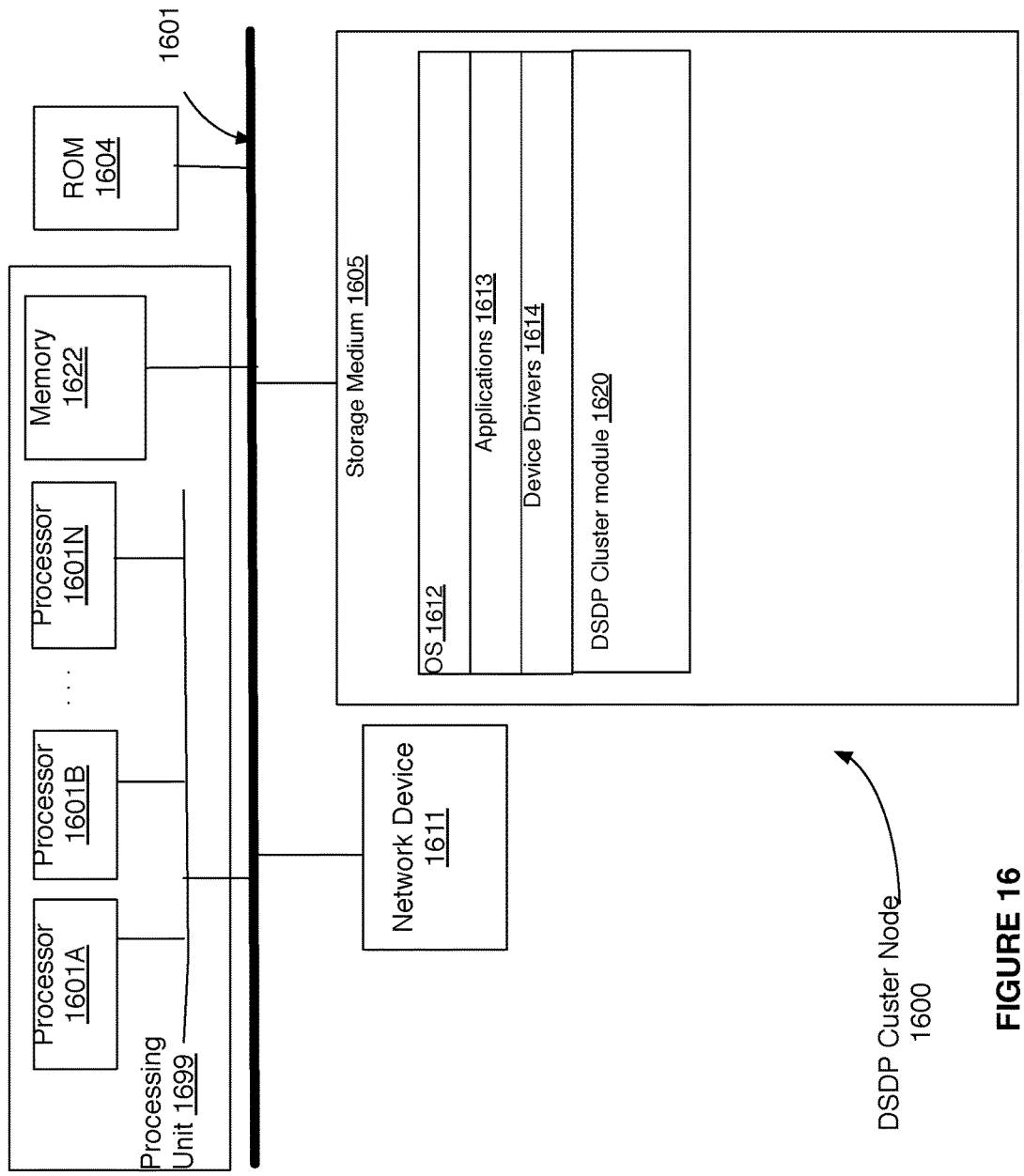
FIG. 16 is an architecture diagram of a DSDP cluster in accordance with embodiments.

In some implementations, the each mapping system, each reducing system, and each framework system is implemented by a single hardware server device (e.g., the server device 1600 of FIG. 16). In some implementations, the each mapping system, each reducing system, and each framework system is implemented by a plurality of hardware server devices (e.g., the server device 1600 of FIG. 16). In some implementations, each hardware server device (e.g., the server device 1600 of FIG. 16) of the DSDP cluster includes at least one of a mapping system, a reducing system, and a framework system of the cluster. In some implementations, the framework system is implemented by a plurality of hardware server devices (e.g., the server device 1600 of FIG. 16).

System Architecture: Decisioning Engine

In some embodiments, each decisioning engine (e.g., 110a-d) is constructed to generate decision information based on pre-processed decisioning input data received from at least one input data pre-processing module (e.g., 180a, 180b, 180c, 180d).

In some embodiments, each decisioning engine (e.g., 110a-d) is constructed to generate decision information based on pre-processed decisioning input data and coercion rules (generated by the type coercion module 112) received from at least one input data pre-processing module (e.g., 180a, 180b, 180c, 180d).

In some embodiments, each decisioning engine is constructed to generate decision information based on raw data received from at least one data provider system (e.g., 131-136). In some implementations, the decisioning system (e.g., 100a, 100b, 100c, 100d) includes one decision module, and the decision module is constructed to provide the generated decision information to at least one decision information consuming system (e.g., 121a, 121b-123-b, 121C, 121d-123d). In some implementation, the decisioning system (e.g., 100a, 100b, 100c, 100d) includes a plurality of decision modules, and at least one decision module is constructed to provide the respective generated decision information to at least one of the plurality of decision modules, and at least one decision module is constructed to provide the respective generated decision information to at least one decision information consuming system (e.g., 121a, 121b-123-b, 121C, 121d-123d).

Platforms

In some embodiments, the decisioning system (e.g., 100a, 100b, 100c, 100d) is a decisioning system platform that provides at least one Application Program Interface (API) (e.g., 160c of FIG. 1C, 160d of FIG. 1D) for communication with at least one of a data provider system (e.g., 131-136), a decision information consuming system (121a, 121b-123b, 121C, 121d-123d), an entity system (e.g., 151b-152b, 151c, 151d-153d), and a data modelling client system (e.g., 141a-141d). In some implementations, at least one of the API's is a RESTful API.

Decision Information Consuming Systems

In some embodiments, decision information consuming systems (e.g., 121a, 121b-123b, 121C, 121d-123d) include at least one of internal decision information consuming systems (e.g., 121a) and external decision information consuming systems (e.g., 121b-123b, 121C, 121d-123d). In some embodiments, decision information consuming systems include decision information consuming systems for at least one of: loan application underwriting decisions, on-line advertising bidding decisions, autonomous vehicle (e.g., self driving car, aircraft, drone, etc.) decisions, visual avoidance decisions (e.g., for visual avoidance systems of an autonomous vehicle), business decisions, financial transaction decisions, robot control decisions, artificial intelligence decisions, and the like. In some embodiments, the decisioning system (e.g., 100a, 100b, 100c, 100d) is constructed to be configurable to provide decision information for any type of decision making process.

In some embodiments, at least one decision information consuming system (or entity system, e.g., systems 151b-153b, 151c, 151d-153d) is constructed to provide configuration information to the decisioning system (e.g., 100a, 100b, 100c, 100d), and the decisioning system is constructed to generate decision information for the decision information consuming system based on the configuration information. In some embodiments, the configuration information includes modeling information provided by a modelling client system of the decision information consuming system (e.g., a modelling client system of one of the systems 151b-153b, 151c, 151d-153d). In some implementations, the configuration information is provided via an API (e.g., one of the API's 160c, 160d).

In some implementations, the configuration information specifies a use for the decision information. In some implementations, the configuration information specifies a type of the decision information. In some implementations, the configuration information specifies a decisioning pipeline (e.g., a pipeline of one or more decision modules of the decisioning engine, e.g., 110a-d) that is used to generate the decision information. In some implementations, the configuration information for each decisioning pipeline specifies at least one of: an input data source, a decision module, a chaining module that is constructed to chain an output of a decision module to an input of another decision module, an output destination for the decision information (e.g., a callback URI), and an action rule that maps an action to be performed to a decision information value.

Data Provider Systems

In some embodiments, the data provider systems 130 include at least one of an external public data system, an external proprietary data provider system (e.g., a credit agency, Thomson Reuters, Bloomberg, and the like), an external social network system, the decisioning system (e.g., in an implementation where the decisioning system provides internal data for use in the decisioning process), and a user system. In some embodiments, a user system is a system used by a user of the decisioning system. In some embodiments, the user system provides user data received from the user via user input. In some implementations, in a case in which the decision information is for underwriting loan applications, input data includes loan application data (e.g., borrower data) provided by a user of a borrower device that is requesting a loan based on the decision information.

In some implementations, input data includes data provided by at least one external system (e.g., 151b-153b, 151c, 151d-153d) of an entity (e.g., decisioning platform account holder, decisioning platform sub-account holder).

Operational Services

In some embodiments, the operational services 171c and 171d of FIGS. 1C and 1D of the multi-tenant systems 100c and 100d, respectively, include at least one of an account system and a billing system for managing accounts (and sub-accounts) of the multi-tenant systems.

Methods

Figure 8:
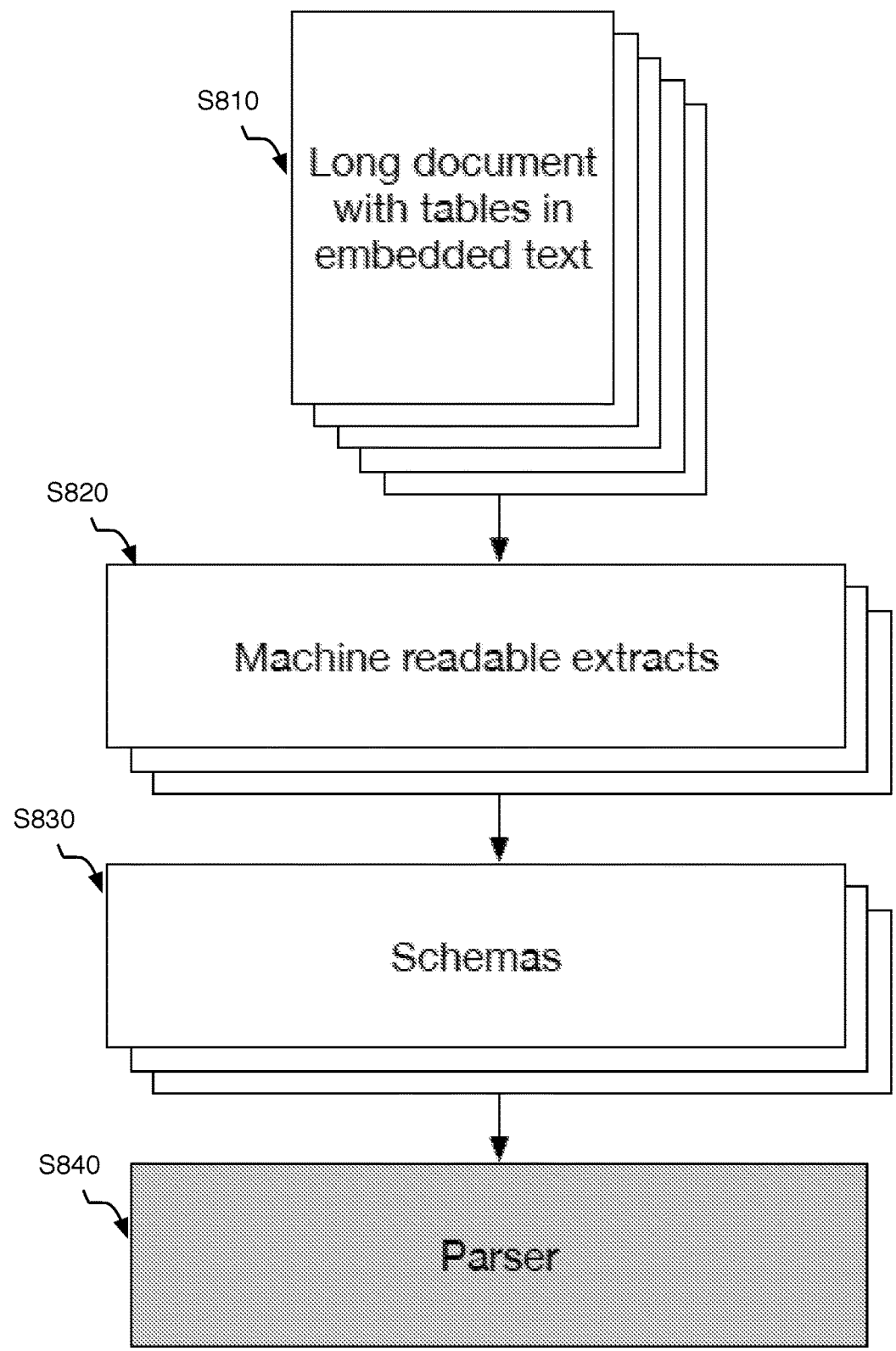
FIG. 8 is a block diagram representation of a method in accordance with embodiments.

FIG. 8 depicts a method Boo for controlling a decisioning system (e.g., 100a, 100b, 100c, 100d) to parse opaque data records provided by a first data provider system to identify each data field of each opaque data record (e.g., by using at least one of a data parsing module, e.g., 111 of FIGS. 2A, 2B, 2C, and a schema generation module, e.g., 210 of the decisioning system), according to some embodiments. As shown in FIG. 8, the method Boo includes: identifying at least one data dictionary table (e.g., 1202 of FIG. 12B) of the first data provider system (e.g., 131-136) from the first human-readable document, and generating at least one computer-readable data file that includes data of each identified data dictionary table (process S810); validating each computer-readable data file to identify at least one validated dictionary table from among the tables included in the at least one computer-readable data file (process S820); generating a schema file (e.g., 1203 of FIG. 12C) from each validated data dictionary table, each schema file defining a parsing process for parsing at least a portion (e.g., a data blob) of an opaque data record provided by the first data provider system into a set of data fields (process S830); parsing each opaque data record (e.g., 1201 of FIG. 12A) provided by the first data provider system into a set of data fields (e.g., 1204 of FIG. 12D) in accordance with the parsing process defined by the corresponding schema file (process S840).

In some embodiments, a schema generation module (e.g., 210 of FIGS. 2A and 2B) performs the processes S810 to S830. In some embodiments, the schema generation module provides each generated schema file to a data parsing module (e.g., 111), and the data parsing module performs the process S840 by parsing opaque data records provided by data provider systems into a sets of data fields in accordance with the parsing processes defined by the corresponding schema files.

In some embodiments, the first human-readable document is a PDF document, and identifying at least one data dictionary table from the first human-readable document includes using a PDF table extractor (e.g., Tabula, an OCR module, or the like) to extract table data from identified tables of the PDF document. In some embodiments, the PDF table extractor identifies data dictionary tables responsive to receipt of user-input via a user input device. In some embodiments, the PDF table extractor controls display of a rendered representation of the PDF document by a display device, and responsive to user-input received via a user input device that specifies positional information that identifies a location of a data dictionary table within the rendered PDF document displayed by the display device, the PDF table extractor extracts text data from the PDF document that corresponds to the received positional information corresponding to the data dictionary table, and generates at least one computer-readable data file that includes data corresponding to the extracted text data of the identified data dictionary table. In some embodiments, the PDF table extractor extracts the text data of the identified data dictionary table by performing an optical character recognition (OCR) process.

In some embodiments, the PDF table extractor identifies data dictionary tables by automatically recognizing tables of the PDF document. In some embodiments, the PDF table extractor automatically recognizes tables of the PDF document based on data elements of the PDF document that indicate presence of a table. In some embodiments, the PDF table extractor automatically recognizes tables of the PDF document by performing an OCR process. In some embodiments, the PDF table extractor automatically recognizes tables of the PDF document by performing an OCR process, and identifying data resulting from the OCR process that corresponds to a table.

In some embodiments, each computer-readable data file is a comma-separated value (CSV) file.

In some embodiments, the opaque data records (e.g., 1201) provided by the data provider system has a FFR record format, and each opaque data record (e.g., 1201) includes a byte length field, a field indicating a type of the opaque data record, and at least one data field as a single un-delimited string of bytes. In some embodiments, each byte of an opaque data record represents a human-readable character, and the opaque data records do not contain delimiting characters.

In some embodiments, each data dictionary table (e.g., 1202) identifies the bytes of a corresponding opaque data record (e.g., 1201) that correspond to the byte length field, the field indicating a type of the opaque data record, and each data field. In some embodiments, each data dictionary table (e.g., 1202) identifies a data type of the byte length field, data type of the field identifying the type of the opaque data record, and a data type for each data field. FIG. 6 depicts an exemplary data dictionary table for the following 15-byte opaque undelimited character string data record in the FFR format: "OA015001LAY2016". As shown in FIG. 6, the first two bytes ("OA") represent the FFR record type field, which has a "character" data type. The next three bytes ("015") represent the FFR byte length field, which has an "integer" data type. The remaining ten bytes represent three FFR data fields. The first data field ("Record Index") is represented by bytes 6-8 ("001"), and has an "integer" data type. The second data field ("Activity Type") is represented by bytes 9-11 ("LAY"), and has a "charcter" data type. The third data field ("Year") is represented by bytes 12-15 ("2016"), and has an "integer" data type.

In some embodiments, validating each computer-readable data file to identify at least one validated dictionary table from among the tables included in the at least one computer-readable data file includes: for the data file of each data dictionary table, at least one of: validating that no two fields have overlapping bytes, and validating that all bytes in the contiguous byte string from the first byte identified by the data dictionary to the last byte identified by the data dictionary are assigned to a field of the opaque data record type.

In some embodiments, generating a schema file from each validated data dictionary table, each schema file defining a parsing process for parsing an opaque data record provided by the data provider system into a set of data fields includes: for each validated dictionary table, generating an XML element for each FFR field specified in the dictionary table, and for each FFR field, generating an attribute for the corresponding XML element that identifies the bytes of the opaque data record that corresponds to the FFR field. In some embodiments, generating at least one schema file from the identified at least one data dictionary table includes: for each dictionary table, generating an XML element for each FFR field specified in the dictionary table, and for each FFR field, generating an attribute for the corresponding XML element that identifies the bytes of the opaque data record that corresponds to the FFR field, and generating an attribute for the corresponding XML element that identifies the data type of the opaque data record that corresponds to the FFR field.

In some embodiments, generating a schema file from each validated data dictionary table, each schema file defining a parsing process for parsing an opaque data record provided by the data provider system into a set of data fields includes: for each validated dictionary table, generating a schema in a CSV format as shown in FIG. 12C.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the bytes of the opaque data record that corresponds to the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the bytes of the opaque data record that corresponds to the FFR field; and characters that represent the data type of the data corresponding to the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the data type of the FFR field; characters that represent the byte of the opaque data record that corresponds to the start of the FFR field; characters that represent the byte of the opaque data record that corresponds to the end of the FFR field.

In some embodiments, generating the schema file for each validated data dictionary table includes: for each validated dictionary table, generating a line of characters in a CSV file for each FFR field specified in the dictionary table, and each line of characters contains characters representing the following data elements separated by commas: characters that represent the name of the FFR field; characters that represent the byte displacement within the opaque data record that corresponds to the start of the FFR field; characters that represent the number of bytes (e.g., byte length) corresponding to the FFR field; and characters that represent the data type of the FFR field.

FIG. 7 depicts an exemplary schema that corresponds to the dictionary table of FIG. 6. As shown in FIG. 7, the schema includes an XML element for each FFR field: "Record Type", "ByteCount", "RecordIndex", "ActivityType", and "Year"). Each XML element of the schema includes a "type" attribute that specifies the corresponding data type, a "begin" attribute that specifies the byte in the opaque data record that corresponds to the first byte of the FFR field, and an "end" attribute that specifies the byte in the opaque data record that corresponds to the last byte of the FFR field.

FIG. 12C depicts an exemplary schema that corresponds to the dictionary table of FIG. 12B. As shown in FIG. 12C, the schema includes a CSV line for each FFR field: "Record Type", "ByteCount", "RecordIndex", "ZipCode", and "CreditScore"). Each line of the schema includes the following information separated by commas: a "field name" attribute that specifies the name of the FFR field, a "type" attribute that specifies the corresponding data type, a "begin" attribute that specifies the byte in the opaque data record that corresponds to the first byte of the FFR field, and an "end" attribute that specifies the byte in the opaque data record that corresponds to the last byte of the FFR field In some embodiments, each schema file specifies the FFR fields of a corresponding opaque data record, and for each FFR field the schema file specifies the bytes of the corresponding record that represent the FFR field. In some embodiments, each schema file specifies the FFR fields of a corresponding opaque data record, and for each FFR field the schema file specifies the bytes of the corresponding record that represent the FFR field and a data type of the FFR field. In some embodiments, the identification of bytes of the opaque data record that correspond to each FFR field defines the parsing process for parsing an opaque data record provided by the data provider system into a set of data fields.

In some embodiments, parsing an opaque data record provided by the data provider system into a set of data fields in accordance with the parsing process defined by the corresponding schema file includes: identifying data fields of the opaque data record by using the schema file which specifies the bytes that correspond to each field of the opaque data record. In some embodiments, parsing an opaque data record provided by the data provider system into a set of data fields in accordance with the parsing process defined by the corresponding schema file includes: identifying a generated schema that corresponds to the opaque data record, and using the identified schema to identify the fields of the opaque data record. In some embodiments, identifying a generated schema that corresponds to the opaque data record includes: identifying a record type of the opaque data record, and identifying the generated schema that corresponds to the identified record type. In some embodiments, the byte (or bytes) of an opaque data record that correspond to the record type are predetermined, and the bytes of the record type of the opaque data record are compared with the record type of each generated schema file to identify a matching schema file.

In some embodiments, identifying a generated schema that corresponds to the opaque data record includes: identifying a record type of the opaque data record from an FFR provided by the data provider system, and identifying the generated schema that corresponds to the identified record type. In some embodiments, the byte (or bytes) of the FFR that correspond to the record type of the opaque data record are predetermined, and the bytes of the record type of the opaque data record are compared with the record type of each generated schema file to identify a matching schema file.

In some embodiments, parsing an opaque data record provided by the data provider system into a set of data fields in accordance with the parsing process defined by the corresponding schema file includes: performing parsing of opaque data records provided by the data provider in accordance with the structure defined by the schema, assigning parsed data of each record of each opaque data record to a particular field name (or variable name, or key value) as defined by the schema (and in some embodiments, assigning a computer data type as defined by the schema).

In some embodiments, the method Boo includes generating a data parsing module (e.g., in) based on the schema file, and parsing each opaque data record (the process S840) includes the decisioning system using the generated data parsing module to parse an opaque data record provided by the data provider system into a set of data fields. In some embodiments, generating the data parsing module includes using an automatic parser generator module to generate computer-readable program instructions of the data parsing module based on the schema file. In some implementations, the computer-readable program instructions are instructions of the Ruby programming language. In some embodiments, parsing each opaque data record (the process S840) includes the decisioning system executing the computer-readable program instructions of the generated data parsing module to parse each opaque data record. In some implementations, the computer-readable program instructions are stored as a Ruby program file that is loaded and executed by the decisioning system to perform the parsing of each opaque data record. In some implementations, the computer-readable program instructions of the data parsing module are stored as a program file that is loaded and executed by the decisioning system to perform the parsing of each opaque data record, and the program file is a program file of any suitable type of programming language (e.g., Ruby, Perl, Python, Java, JavaScript, C, C++, and the like).

In some embodiments, the program instructions of the data parsing module control the decisioning system to identify a record type of the opaque data record, and execute program instructions of the data parsing module that correspond to the generated schema that matches the identified record type. In some embodiments, the byte (or bytes) of an opaque data record that correspond to the record type are predetermined, and the bytes of the record type of the opaque data record are used by the decisioning system to selectively execute program instructions of the data parsing module that correspond to the matching schema file.

In some embodiments, the program instructions of the data parsing module control the decisioning system to identify a record type of the opaque data record from an FFR provided by the data provider system, and execute program instructions of the data parsing module that correspond to the generated schema that matches the identified record type. In some embodiments, the byte (or bytes) of the FFR that correspond to the record type of the opaque data record are predetermined, and the bytes of the record type of the opaque data record are used by the decisioning system to selectively execute program instructions of the data parsing module that correspond to the matching schema file.

As an example of parsing an opaque data record, in a case where a decisioning system parses the opaque data record "OA015001LAY2016" in accordance with the schema defined by FIG. 7, the decisioning system stores the value "OA" as a value of the "Record type" field (or key), stores the value "015" as a value of the "Byte count" field (or key), stores the value "001" as a value of the "Record index" field (or key), stores the value "LAY" as a value of the "Activity type" field (or key), and stores the value "2016" as a value of the "Year" field (or key).

For example, in a case where a decisioning system parses the opaque data record "OA015001LAY2016" in accordance with the schema defined by FIG. 7, the decisioning system stores the value "OA" as a value of the "Record type" field having a "character" data type, stores the value "015" as a value of the "Byte count" field having an "integer" data type, stores the value "001" as a value of the "Record index" field having an "integer" data type, stores the value "LAY" as a value of the "Activity type" field having a "character" data type, and stores the value "2016" as a value of the "Year" field having an "integer" data type.

In some embodiments, the data provider system that provides the opaque data records and the data dictionary is a system of a credit reporting agency (e.g., Equifax, Transunion, Experian), the opaque data records are credit data records, and the data dictionary identifies the data field corresponding to each byte of an opaque data record.

In some embodiments, the method Boo is performed by the decisioning system e.g., 100a, 100b, 100c, 100d). In some embodiments, the method Boo is performed by the schema generation module (e.g., 210 of FIGS. 2A and 2B). In some embodiments, the method Boo is performed by a modeling client system (e.g., 141a-141d). In some embodiments, the method Boo is performed by an entity system (e.g., 151b-153b, 151c, 151d-153d). In some embodiments, the method Boo is performed by a data provider system (e.g., 131-136). In some embodiments, the method Boo is performed by a decision information consuming system (e.g., 121a, 121b-123b, 121C, 121d-123d).

Figure 12D:
FIG. 12D is a depiction of exemplary parsed data generated for a credit report opaque data record, in accordance with embodiments.

In some embodiments, parsing each opaque data record provided by a first data provider system (e.g., 131-136) into a set of data fields in accordance with the parsing process defined by the corresponding schema file includes: generating a set of key-value pairs (or representation thereof) (e.g., 1204 of FIG. 12D) for each data field of the set of data fields. In some embodiments, parsing each opaque data record provided by the first data provider system into a set of data fields in accordance with the parsing process defined by the corresponding schema file includes: assigning a data type to each data field of the set of data fields (e.g., as shown in FIG. 12D). In some embodiments, responsive to a decisioning request for decision information by a consuming system (e.g., 121a, 121b-123b, 121C, 121d-123d), the decisioning system (e.g., 100a-100d) accesses at least one opaque data record (e.g., 1201 of FIG. 12A) of the first data provider system and parses the accessed opaque data record into a set of key-value pairs (or representation thereof). In some embodiments, the decisioning system generates decision information from the set of key-value pairs (or representation thereof), and the decisioning system provides the generated decision information to the consuming system as a response to the decisioning request provided by the consuming system. In some embodiments, the decisioning request is a request in accordance with an API (e.g., 160c, 160d) of the decisioning system. In some embodiments, the decisioning request specifies data to be used by the decisioning system to generate the decision information.

In some embodiments, the consuming system is a system of a lending system, the lending system receives borrower data from a borrower device, the lending system includes the borrower data in the decisioning request, the decisioning system uses the borrower data to generate the decision information, and the first data provider system includes at least a credit agency system. In some embodiments, the credit agency system includes at least one of a Transunion system, an Equifax system, an Experian system and a LexisNexis system. In some embodiments, the decisioning system generates decision information from the set of key-value pairs (or representation thereof) in real-time with respect to the decisioning request.

In some embodiments, the decisioning system parses the accessed opaque data record (e.g., 1201 of FIG. 12A) in real-time with respect to the decisioning request. In some embodiments, the decisioning system generates the decision information within 40 seconds from receipt of the decisioning request.

In some embodiments, the decisioning system selects the first data provider system based on the decisioning request. In some embodiments, the decisioning system selects a plurality of data provider systems based on the decisioning request, and the first data provider system is a system of the selected plurality of data provider systems. In some embodiments, the decisioning system generates a schema file for two or more of the selected plurality of data provider systems by parsing a human-readable document for each of the two or more data provider systems.

In some embodiments, the decisioning system generates decision rationale information from the set of key-value pairs (or representation thereof), and the decisioning system provides the generated decision rationale information to the consuming system. In some embodiments, the decision rationale information is provided as a response to a decisioning rationale request provided by the consuming system. In some embodiments, the decision rationale information is adverse action information to be used in an adverse action letter in accordance with the Fair Credit Reporting Act. In some embodiments, the decision rationale information is generated asynchronously with respect to the decisioning request. In some embodiments, the decision rationale information is generated at least one hour after receipt of the decisioning request.

Methods for Type Coercion

In some embodiments, a data processing system stores a coercion rule for each data field of a first data set provided by an external data provider system. Each stored coercion rule identifies at least one data type for the corresponding data field. Responsive to a second data set provided by the data provider system, the data processing system coerces each data item of the second data set into at least one data type specified by the stored coercion rule for the data field of the data item to generate at least one converted data item of the second data set. The data processing system generates information from at least one converted data item, and provides the information to a consuming system.

Figure 13A:
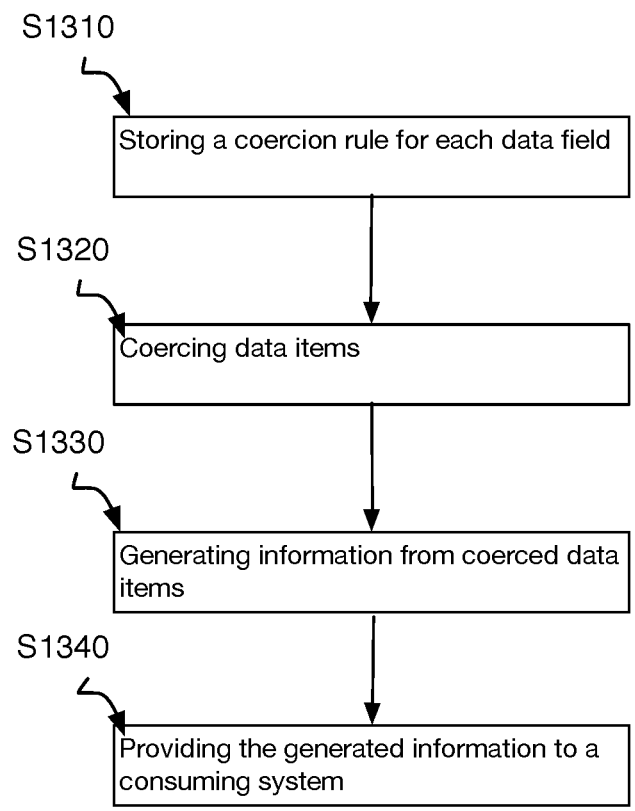
FIGS. 13A-C are block diagram representations of methods in accordance with embodiments.

FIG. 13A depicts a method 1300 for controlling a data processing system (e.g., 100a-100d) to store a coercion rule for each data field of data provided by an external data provider system (e.g., 131-136), according to some embodiments. In some embodiments, the data processing system is a decisioning system. As shown in FIG. 13A, the method 1300 includes: storing a coercion rule for each data field of a first data set provided by an external data provider system (e.g., 131-136), wherein each stored coercion rule identifies at least one data type for the corresponding data field (process S1310); responsive to a second data set provided by the external data provider system, coercing each data item of the second data set into at least one data type specified by the stored coercion rule for the data field of the data item to generate at least one converted data item of the second data set (process S1320); generating information from at least one converted data item (process S1330); and providing the generated information to a consuming system (e.g., 121*a*, 121*b*-123*b*, 121C, 121*d*-123*d*) (process S1340).

In some implementations, the type coercion module 112 performs the process S1310. In some implementations, the type coercion module 112 performs the process S1320. In some implementations, the decisioning engine (e.g., 110*a*-*d*) performs the process S1320. In some implementations, the decisioning engine (e.g., 110*a*-*d*) performs the process S1330. In some implementations, the decisioning engine (e.g., 110*a*-*d*) performs the process S1340. In some implementations, the API system (e.g., 160*c*, 160*d*) performs the process S1340.

In some implementations, the first data set is a training data set. In some implementations, the second data set is an input data set. In some implementations, the information is decisioning information.

Storing a Coercion Rule (Process S1310): Parsing First Data Set Data

In some implementations, storing a coercion rule (process S1310) includes: the data parsing module 111 receiving first data set data provided by the external data provider (e.g., one of 131-136), and parsing the first data set data provided by the external data provider to identify each data field of each record of first data; the data parsing module 111 providing the type coercion module 112 with a set of parsed first data set records, each first data set record including a set of data fields; and the type coercion module 112 receiving the set of parsed first data set records provided by the data parsing module 111. In some implementations, a first data set record includes a data item for each data field of the first data record. In some implementations, a first data set record includes for each data field of the first data record either a data item or a marker that indicates that a data item is not available for the data field (e.g., a not available (NA) value). In some implementations, each data record includes a record identifier (ID) and a list of (field identifier (ID), data item) pairs (e.g., {(<training recordID A>, {(<field 1>, <record A data item 1>), (<field 2>, <record A data item 2>), ... (<field N>, <record A data item N>)}), (<training recordID B>, {(<field 1>, record B data item 1>), (<field 2>, <record B data item 2>), ... (<field N>, <record B data item N>)})}).

In some embodiments, the data parsing module (e.g., 111) parses the first data set data provided by the external data provider in accordance with the processes described herein for parsing opaque data records.

In some embodiments, the data parsing module (e.g., 111) parses the first data set data provided by the external data provider by using a data dictionary provided by the external data provider system.

In some embodiments, the data parsing module (e.g., 111) parses the first data set data provided by the external data provider in accordance with the method Boo of FIG. 8 described herein.

Storing a Coercion Rule (Process S1310): Content of Coercion Rule

In some implementations, storing a coercion rule (process S1310) includes: determining a default data type for the data field corresponding to the coercion rule, and generating the coercion rule to include an identifier that identifies the determined default data type, and storing the generated coercion rule.

In some implementations, storing a coercion rule (process S1310) includes: determining a plurality of coercible data types for the data field corresponding to the coercion rule, determining a default data type of the plurality of coercible data types, generating the coercion rule to include an identifier that identifies each determined coercible data type and the determined default data type, and storing the generated coercion rule.

In some implementations, storing a coercion rule (process S1310) includes: determining a plurality of coercible data types for the data field corresponding to the coercion rule, generating the coercion rule to include an identifier that identifies each determined coercible data type, and storing the generated coercion rule.

In some implementations, storing a coercion rule (process S1310) includes: determining a default data type for the data field corresponding to the coercion rule, generating the coercion rule to include a single identifier that identifies the determined default data type, and storing the generated coercion rule.

Coercing Data (Process S1320)

In some implementations, coercing each data item of the second data set (process S1320) includes: the data parsing module 111 receiving second data set data (e.g., input data to be processed by the decisioning engine) provided by the external data provider (e.g., one of 131-136) that provides the first data set data, and parsing the second data set data provided by the external data provider to identify each data field of each record of second data set data.

In some implementations, coercing each data item of the second data set (process S1320) includes: the data parsing module 111 providing the type coercion module 112 with a set of parsed second data set data records, each second data set data record including a set of data fields. In some implementations, a second data set data record includes a data item for each data field of the second data set record. In some implementations, a second data set record includes for each data field of the second data set data record either a data item or a marker that indicates that a data item is not available for the data field (e.g., a not available (NA) value). In some implementations, each data record includes a record identifier (ID) and a list of (field identifier (ID), data item) pairs (e.g., {(<decisioning input recordID A>, {(<field 1>, <record A data item 1>), (<field 2>, <record A data item 2>), ... (<field N>, <record A data item N>)}), (<decisioning input recordID B>, {(<field 1>, <record B data item 1>), (<field 2>, <record B data item 2>), ... (<field N>, <record B data item N>)})}). In some implementations, the type coercion module 112 receives the set of parsed second data set data records provided by the data parsing module 111. For each data item (e.g., data items 1, 2 and N of the decisioning input recordID A, and data items 1, 2 and N of the decisioning input recordID B), the type coercion module 112 coerces the second data set data item by using the stored coercion rule for the data field of the second data set data item to generate a coerced second data set data item. For example, if the following coercion rule (<field 1>, "Integer Date") is stored for <field 1>, then data item 1 of the decisioning input recordID A and data item 1 of the decisioning input recordID B are each coerced into an "Integer Date" data type.

In some embodiments, coercing each data item of the second data set (process S1320) includes: coercing each data item of the second data set into a single data type specified by the stored coercion rule for the data field of the data item.

In some embodiments, coercing each data item of the second data set (process S1320) includes: coercing each data item of the second data set into a plurality of data types specified by the stored coercion rule for the data field of the data item.

In some embodiments, coercing each data item of the second data set (process S1320) includes: coercing each data item of the second data set into a default data type specified by the stored coercion rule for the data field of the data item.

In some embodiments, coercing each data item of the second data set (process S1320) includes: determining a default data type from among a plurality of data types specified by the stored coercion rule for the data field of the data item, and coercing each data item of the second data set into the determined default data type.

In some implementations, generating information (process S1330) includes: the type coercion module 112 providing each coerced second data set data item to the decisioning engine (e.g., 110a-d of FIGS. 1A-1D), and the decisioning engine generating information (e.g., a credit score) from at least one coerced second data set data item provided by the type coercion module 112, and providing the generated information to a consuming system (e.g., 121a, 121b, 122b, 123b, 121C, 121d, 122d, 123d).

In some implementations, coercing each second data set data item (process S1320) includes: the data parsing module 111 providing the decisioning engine with the set of parsed second data set data records, and the type coercion module 112 providing the decisioning engine with the stored coercion rules, and for each data item, the decisioning engine coercing the second data set data item by using the stored coercion rule (provided by the type coercion module 112) for the data field of the second data set data item to generate a coerced second data set data item. In some implementations, generating information (process S1330) includes: the decisioning engine generating the information from at least one of the coerced second data set data items generated by the decisioning engine.

Determining a Default Data Type

As discussed herein, in some embodiments, the data processing system (e.g., decisioning system) determines a default data type for a data field during generation of a coercion rule, and in some embodiments, the data processing system determines a default data type for a data field during coercion.

Figure 13B:
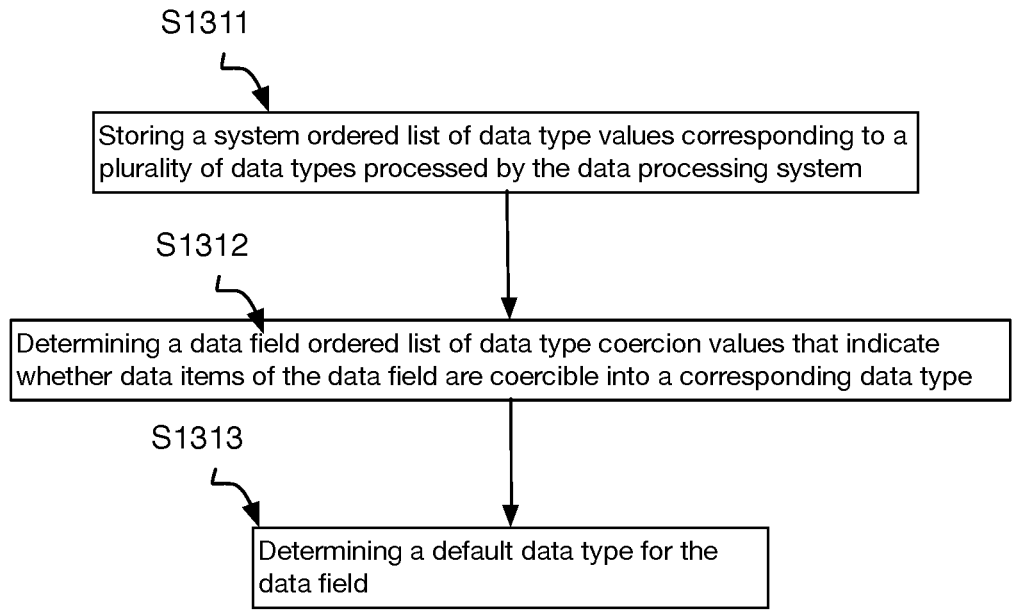

In some embodiments, determining a default data type includes: storing a system ordered list of system data type values corresponding to a plurality of data types processed by the data processing system (process S1311 of FIG. 13B); for each data field of the first data set, determining a data field ordered list of data type coercion values for the data field from the first data set, wherein each data type coercion value indicates whether data items of the data field are coercible into a corresponding data type of the plurality of data types of the data processing system (process S1312 of FIG. 13B); for each data field, a determining default type for the data field (process S1313 of FIG. 13B). In some embodiments, determining a default type for the data field (process S1313 of FIG. 13B) includes: for each data type coercion value of the data field ordered list for the data field, determining a product of the data type coercion value of the data field ordered list and the data type value of the system ordered list that corresponds to the data type coercion value (process S1314 of FIG. 13C) (e.g., multiply the data type coercion value by the data type to generate the product); determining a sum of the products determined for the data field ordered list (process S1315 of FIG. 13C); performing a logarithm (log) operation on the determined sum for the data field (process S1316 of FIG. 13C); performing a floor operation on a result of the log operation, the result of the floor operation identifying a list position in the system ordered list (process S1317 of FIG. 13C); and selecting a data type corresponding to the result of the floor operation (process S1318 of FIG. 13C).

In some embodiments, performing a floor operation includes determining the largest integer that is less than the result of the log operation.

In some embodiments, selecting a data type corresponding to the result of the floor operation includes: selecting a data type identifier corresponding to the data type value of the list position in the system ordered list that is identified by the result of the floor operation.

In some embodiments, determining a default data type includes generating a coercion rule for the data field that specifies the selected data type as the default type for the data field and storing the generated coercion rule. In some implementations, the default data type is identified by a data type identifier. In some implementations, the coercion rule specifies the default data type by including a data type identifier for the default data type.

Determining Products, Sums, Logs (Logarithm) and Floors

Figure 9:
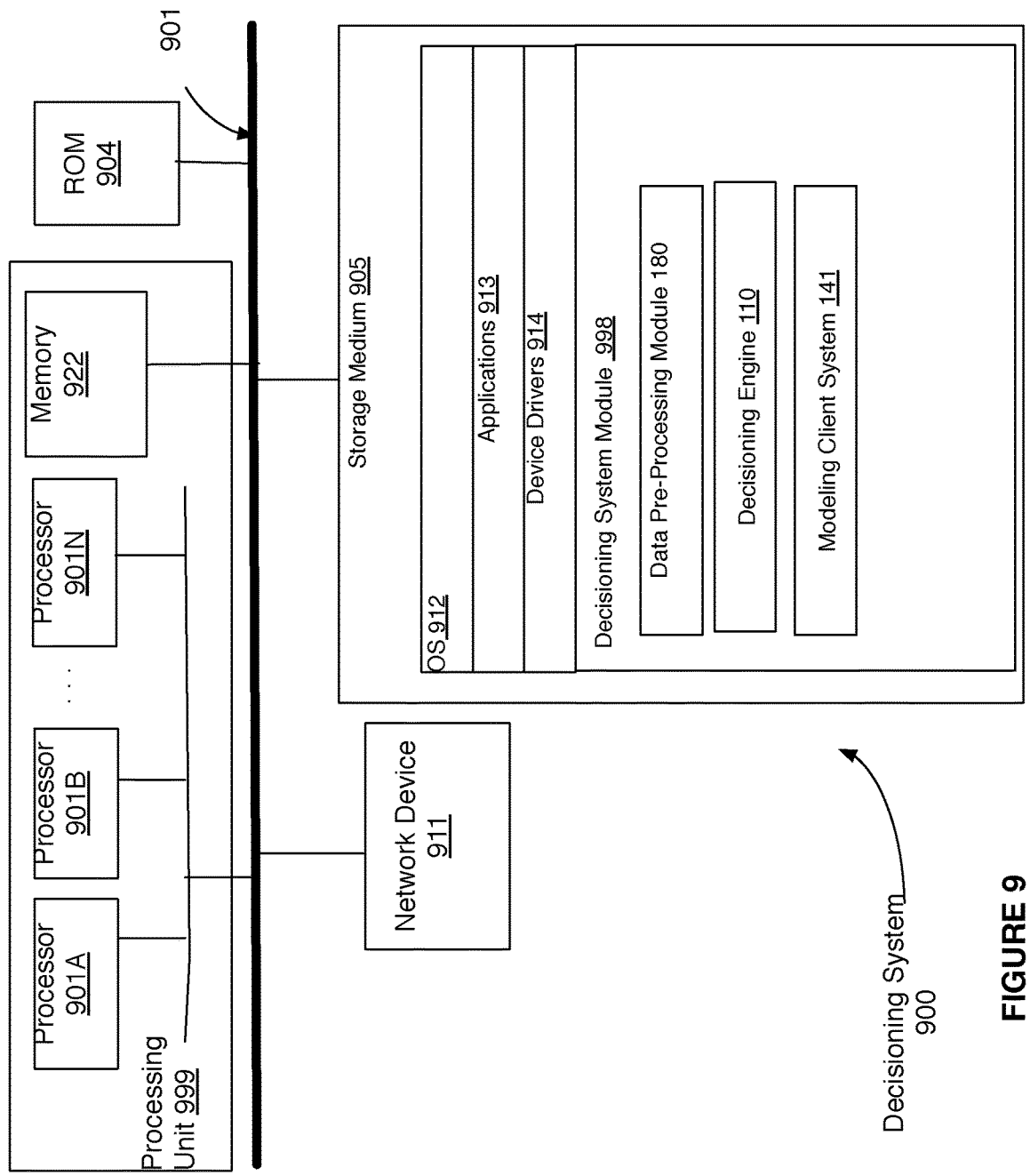
FIG. 9 is an architecture diagram of a data processing system in accordance with embodiments.

In some embodiments, data for each operand of each product operation is stored in a contiguous block of memory (e.g., a contiguous block of memory of the processing unit 999 of FIG. 9, a contiguous block of memory of the processing unit 1699 of FIG. 16).

In some embodiments, data for each operand of each sum operation is stored in a contiguous block of memory (e.g., a contiguous block of memory of the processing unit 999 of FIG. 9, a contiguous block of memory of the processing unit 1699 of FIG. 16).

In some embodiments, data for each operand of each logarithm operation is stored in a contiguous block of memory (e.g., a contiguous block of memory of the processing unit 999 of FIG. 9, a contiguous block of memory of the processing unit 1699 of FIG. 16).

In some embodiments, data for each operand of each floor operation is stored in a contiguous block of memory (e.g., a contiguous block of memory of the processing unit 999 of FIG. 9, a contiguous block of memory of the processing unit 1699 of FIG. 16).

In some implementations, the data processing system (e.g., 110a-d of FIGS. 1A-1D) determines each product (process S1314 of FIG. 13C) by using at least one of arithmetic operations and bitwise logical operations of at least one arithmetic logic unit (ALU) of the data processing system that supports a SIMD (Single Instruction Multiple Data) system that provides native support for multiply and accumulate operations. In some implementations, the data processing system determines each sum (process S1315 of FIG. 13C) by using at least one of arithmetic operations and bitwise logical operations of at least one ALU of the data processing system that supports a SIMD system that provides native support for multiply and accumulate operations.

In some implementations, the processing system performs a log operation (process S1316 of FIG. 13C) by using a hardware device of the processing system. In some implementations, the processing system performs a log operation (process S1316 of FIG. 13C) by using an operation of a central processing unit (CPU) of the processing system. In some implementations, the processing system performs a log operation (process S1316 of FIG. 13C) by using an operation a graphics processing unit (GPU) of the processing system.

In some implementations, the processing system performs a floor operation (process S1317 of FIG. 13C) by using a hardware device of the processing system. In some implementations, the processing system performs a floor operation (process S1317 of FIG. 13C) by using an operation of a central processing unit (CPU) of the processing system. In some implementations, the processing system performs a floor operation (process S1317 of FIG. 13C) by using an operation a graphics processing unit (GPU) of the processing system (e.g., a GPU of the processing unit 999 of FIG. 9, a GPU of the processing unit 1699 of FIG. 16).

In some implementations, each product is determined by storing data for each operand into a hardware register of a processing unit (e.g., the processing unit 999 of FIG. 9, the processing unit 1699 of FIG. 16) of the processing system, and providing the processing unit with a machine instruction that specifies each hardware register and an opcode for one of a multiplication operation and a bitwise logical operation. In some implementations the processing unit is a central processing unit (CPU). In some implementations, the processing unit is a graphics processing unit (GPU).

In some implementations, each sum is determined by storing data for each operand into a hardware register of a processing unit of the processing system, and providing the processing unit with a machine instruction that specifies each hardware register and an opcode for one of an addition operation and a bitwise logical operation. In some implementations the processing unit is a central processing unit (CPU). In some implementations, the processing unit is a graphics processing unit (GPU).

In some implementations, each log operation is performed by storing data for each operand into a hardware register of a processing unit of the processing system, and providing the processing unit with a machine instruction that specifies each hardware register and an opcode for one of a log operation and a bitwise logical operation. In some implementations the processing unit is a central processing unit (CPU). In some implementations, the processing unit is a graphics processing unit (GPU).

In some implementations, each floor operation is performed by storing data for each operand into a hardware register of a processing unit of the processing system, and providing the processing unit with a machine instruction that specifies each hardware register and an opcode for one of a floor operation and a bitwise logical operation. In some implementations the processing unit is a central processing unit (CPU). In some implementations, the processing unit is a graphics processing unit (GPU).

In some embodiments, the processing system uses a CPU that supports a SIMD system that provides native support for multiply and accumulate operations to determine each default data type. In some embodiments, the processing system uses a GPU that supports a SIMD system that provides native support for multiply and accumulate operations to determine each default data type.

In some implementations, each hardware register, ALU, CPU, and GPU is included in a processing unit of the data processing system unit (e.g., the processing unit 999 of FIG. 9, the processing unit 1699 of FIG. 16).

Determining Whether a Data Item is Coercible

In some implementations, the data processing system determines whether a data item of a data field is coercible into a corresponding data type by converting the data item into the corresponding data type and determining whether the converted data item is a valid data item, and in a case where the converted data item is a valid data item, the data item is coercible into the data type. In some implementations, the data processing system converts each data item by performing a type casting operation. In some implementations, the data processing system determines whether the converted data item is a valid data item by performing an input validation operation. In some implementations, an operator of the data processing system provides user-input to store machine-executable instructions at the data processing system for determining whether a converted data item is a valid data item, and the data processing system determines whether a converted data item is a valid item by executing the machine-executable instructions.

Selecting a Data Type Identifier from a Result of the Floor Operation

Figure 13C:
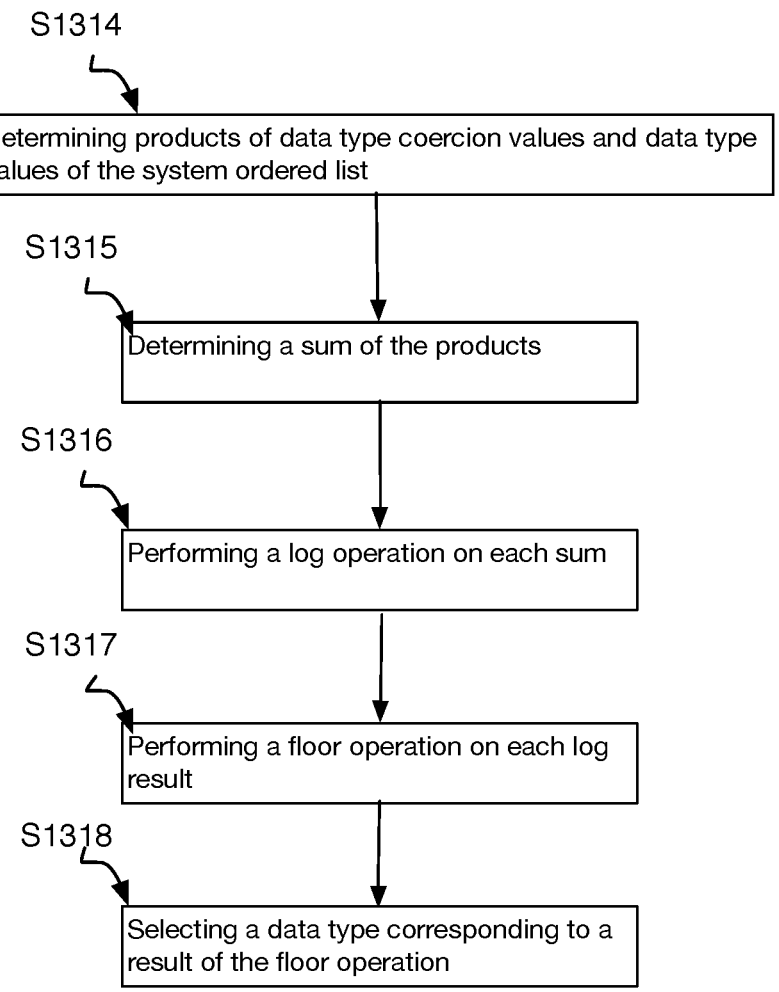

In some implementations, selecting a data type corresponding to the result of the floor operation (process S1318 of FIG. 13C) includes: selecting a data type identifier corresponding to the data type value of the list position in the system ordered list that is identified by the result of the floor operation (process S1317 of FIG. 13C).

In some implementations, the system ordered list is a list of (<data type value>, <data type identifier>) pairs, and selecting a data type identifier corresponding to the data type value of the list position in the system ordered list that is identified by the result of the floor operation includes selecting the (<data type value>, <data type identifier>) pair having a position that is identified by a result of the floor operation, and selecting the data type identifier of the identified pair. For example, if the result of the floor operation is "0", then the data processing system selects the first pair, if the result of the floor operation is "4", then the data processing system selects the fifth pair, etc.

In some implementations, selecting a data type identifier corresponding to the result of the floor operation (process S1318 of FIG. 13C) includes: selecting a data type identifier from a list of system data type identifiers that corresponds to the system ordered list of system data type values. The selected data type identifier is a data type identifier having a position in the list of system data type identifiers that is identified by the result of the floor operation (process S1318 of FIG. 13C). For example, if the result of the floor operation is "0", then the data processing system selects the first data type identifier from the list of system data type identifiers, if the result of the floor operation is "4", then the data processing system selects the fifth data type identifier from the list of system data type identifiers, etc. For example, for the list {String, Double, Bool, Integer, Integer Date} of system data type identifiers, if the result of the floor operation is "0", then the data processing system selects "String" from the list of system data type identifiers, if the result of the floor operation is "4", then the data processing system selects "Integer Date" from the list of system data type identifiers, etc.

System Ordered List

Table 1 depicts an exemplary system ordered list.

TABLE 1

| System Ordered List |
| --- |
| {00001, 00010, 00100, 01000, 10000} |

Each element of the system ordered list corresponds to a particular data type. For example, with respect to the system ordered list of Table 1, the value 00001 corresponds to a first data type (e.g., "String"), the value 00010 corresponds to a second data type (e.g., "Double"), the value 00100 corresponds to a third data type (e.g., "Bool"), the value 01000 corresponds to a fourth data type (e.g., "Integer"), and the value 10000 corresponds to a fifth data type (e.g., "Integer Date"). In some implementations, the data type values of the system ordered list (e.g., "00001", "00010", "00100", "01000", "10000") have an order that is consistent with coercion relationships among the plurality of data types. In some implementations, the data type values of the system ordered list are ordered in accordance with increasing strength of the corresponding data type, wherein a first data type is stronger than a second data type if the first data type is coercible into the second data type. For example, for the system ordered list {00001, 00010, 00100, 01000, 10000}, the data type values correspond to the data types {String, Double, Bool, Integer, Integer Date}, respectively, and a Double is stronger than a String, an Integer is stronger than a Double, and an Integer Date is stronger than an Integer, a Bool is stronger than a Double; an Integer Date is not coercible into a Bool, an Integer is not coercible into a Bool, and a Bool is coercible into a Double. For example, in an implementation in which not all Boolean data items can be converted directly to integers (in some programming languages, Boolean values do have corresponding integer values, with false assigned to zero and true to any non-zero value), for the system ordered list {00001, 00010, 00100, 01000, 10000}, the data type values correspond to the data types {String, Double, Bool, Integer, Integer Date}, respectively, and a Double is stronger than a String, an Integer is stronger than a Double, and an Integer Date is stronger than an Integer, a Bool is stronger than a String; an Integer Date is not coercible into a Bool, an Integer is not coercible into a Bool, and a Bool is not coercible into a Double. In some implementations, the coercion relationships indicate for each pair of data types whether a data item of a first data type of the pair is coercible into a second data type of the pair.

In some implementations, the system ordered list is an ordered list of pairs of data type values and corresponding data type identifiers (e.g., {(00001, "String"), (00010, "Double"), (00100, "Bool"), (01000, "Integer"), (10000, "Integer Date")}). In some implementations, the system ordered list is an ordered list of data type values, and each data type value of the system ordered list corresponds to a data type identifier having a same list position in a list of data type identifiers (e.g., {"String", "Double", "Bool", "Integer", "Integer Date"}), wherein the data type identifier of a data type value is determined by retrieving the list item in the list of data type identifiers that has the same list position of the data type value in the system ordered list. In some implementations, the system ordered list and the list of data type identifiers has a same list length.

System Ordered List Data Type Values

In some embodiments, for each list position in the system ordered list, the corresponding data type value is generated by performing an exponentiation operation using an exponent equal to an integer value that represents the list position in the system ordered list. In some embodiments, a base of the log operation (e.g., the process S1316 of FIG. 13C) is equal to a base of the exponentiation operation. For example, for a system ordered list having a length of 5 (having 5 list elements), the first data type value is $b^0$, the second data type value is $b^1$, the third data type value is $b^2$, the fourth data type value is $b^3$, and the fifth data type value is $b^4$, wherein b is the base of the exponentiation operation. In some embodiments, the base of the exponentiation operation ("b") is 2, and the log operation (e.g., the process S1316 of FIG. 13C) is a base 2 log operation. For example, for a system ordered list having a length of 5 in which each data type value is computed using a base of 2, the first data type value is $2^0=1$, the second data type value is $2^1=2$, the third data type value is $2^2=4$, the fourth data type value is $2^3=8$, and the fifth data type value is $2^4=16$, and a system ordered list including 5-bit binary values for each data type value is {00001, 00010, 00100, 01000, 10000}. As illustrated by the foregoing example, the binary representation of each data type value includes a single "1" bit, and the bit position of the "1" bit shifts to the next significant bit position in each successive data type value. In other words, the "1" bit shifts in order of increasing bit order with each successive data type value.

Data Field Ordered Lists

In some implementations, each data type coercion value of each data field ordered list is a sequence of bit values. In some implementations, each data type coercion value of each data field ordered list is a sequence of binary values. In some implementations, each data type coercion value of each data field ordered list is one of a sequence of binary "one" values (e.g., "11111") and a sequence of binary "zero" values (e.g., "00000").

Table 2A depicts an exemplary data field ordered list in accordance with an implementation in which each data type coercion value is a 5-bit bit sequence, wherein each value is either 31 ("11111") or 0 ("00000").

TABLE 2A

| Data Field Ordered List: bit sequences of 1s or 0s |
|---|
| {11111, 11111, 00000, 11111, 11111} |

In some implementations, the number of bits stored for each data type coercion value is equal to the number of bits stored for each system data type value. For example, in a case where five bits are used to store each system data type value for the system ordered list (e.g., {00001, 00010, 00100, 01000, 10000}), five bits are also used to store each data type coercion value for a data field ordered list (e.g., {11111, 11111, 00000, 11111, 11111}) generated for the data processing system.

In some implementations, each data type coercion value of each data field ordered list is a single binary value, e.g., one of a "1" and a "0" value. In some implementations, each data type coercion value of each data field ordered list is a single binary value, e.g., one of a "1" and a "0" value. In some implementations, each data type coercion value of each data field ordered list is a single integer having a value of either "0" or "1". Table 2B depicts an exemplary data field ordered list in accordance with an implementation in which each data type coercion value is a 1-bit binary value.

TABLE 2B

| Data Field Ordered List: binary values |
|---|
| {1, 1, 0, 1, 1} |

Table 2C depicts an exemplary data field ordered list in accordance with an implementation in which each data type coercion value is an integer value represented by 8 bits.

TABLE 2C

| Data Field Ordered List: integer values |
|---|
| {00000001, 00000001, 00000000, 00000001, 00000001} |

In some embodiments, a length of each data field ordered list equals a length of the system ordered list, and a data type value of the system ordered list and a data type coercion value of a data field ordered list having a same list position correspond to a same data type of the plurality of data types. For example, for the system ordered list {00001, 00010, 00100, 01000, 10000} and the data field ordered list {11111, 11111, 00000, 11111, 11111}, both lists have the same length, and the second data type coercion value of the data field ordered list (e.g., "11111") correspond to the second data type value of the system ordered list (e.g., "00010").

Determining Data Field Ordered Lists

Figure 14:
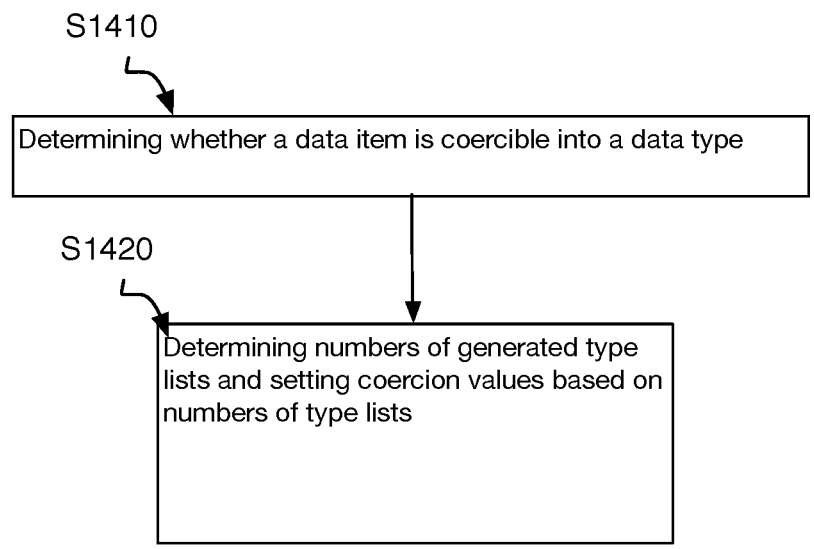
FIG. 14 is a block diagram representation of a method in accordance with embodiments.

In some embodiments, for each data field of the first dataset, determining a data field ordered list of data type coercion values for the data field (process S1312 of FIG. 13B) includes: for each data item of the data field included in the first data set, determining for each data type whether the data item is coercible into the data type (e.g., as described above) and generating a type list (e.g., TypeList Data Item A of Field 1={string, Bool}) that includes a corresponding data type identifier for each determined data type (process S1410 of FIG. 14); and for each data type of the plurality of data types, determining a number of generated type lists that include the data type, and for each data type that has a number that satisfies a threshold value, set the data type coercion value for the data type in the data field ordered list to a value (e.g., 11111, 00001, or 1) that indicates that data items of the data field are coercible into the data type (process S1420 of FIG. 14) (e.g., Data Field Ordered List of Field 1={11111, 11111, 00000, 11111, 11111}). For example, if data field 1 has three data items in the first data set, and each of the three data items can be coerced into either a string and a Boolean, then the data processing system generates the following three type lists: (data field 1, data item 1, {String, Bool}); (data field 1, data item 2, {String, Bool}); (data field 1, data item 3, {String, Bool}). In the foregoing example, the data processing system determines that the data type "String" is included in three type lists for the data field 1, the data type "Bool" is included in three type lists for the data field 1, and the data types "Double", "Integer", and "Integer" data are not included in any type lists for the data field 1. Assuming that the threshold value is satisfied by a data type that is included in at least three type lists for data field 1, the data processing system sets the data type coercion value for the String and Bool data types in the data field ordered list to a value (e.g., 11111, 00001, or 1) that indicates that data items of the data field are coercible into the String and Bool data types.

Determining Data Field Ordered Lists—Distributed Process

In some embodiments, the data processing system determines each data field ordered list by using a distributed storage and distributed processing (DSDP) cluster (e.g., the DSDP cluster 1500 of FIG. 15), as described herein.

In some embodiments, the DSDP cluster 1500 includes at least a first mapping system 1511, a second mapping system 1512, a DSDP framework system 1501, and at least one reducing system 1521. In some embodiments, the DSDP cluster includes at least one mapping system, a DSDP framework system, and at least one reducing system. In some implementations, the DSDP cluster includes at least one hardware machine. In some implementations, the DSDP cluster includes a plurality of virtual machines running on any combination of one or more hardware machines.

In some implementations, data processing system provides a first sub-set of first data set records (e.g., {(<training recordID A>, {(<field 1>, <record A data item 1>), (<field 2>, <record A data item 2>), . . . (<field N>, <record A data item N>)}), . . . (<training recordID G>, {(<field 1>, <record B data item 1>), (<field 2>, <record B data item 2>), . . . (<field N>, <record B data item N>)})}) of the first data set provided by the external data provider system to the first mapping system 1511 by using the framework system 1501, and the data processing system provides a second sub-set of first data set records (e.g., {(<training recordID H>, {(<field 1>, <record A data item 1>), (<field 2>, <record A data item 2>), . . . (<field N>, <record A data item N>)}), . . . (<training recordID P>, {(<field 1>, record B data item 1>), (<field 2>, <record B data item 2>), . . . (<field N>, <record B data item N>)})}) of the first data set provided by the external data provider system to the second mapping system 1512 by using the framework system 1501.

Mapping Process

At the first mapping system 1511, for each data field included in the first sub-set of first data set records: for each data item included in the first sub-set, the first mapping system 1511 determines for each data type of the plurality of data types of the data processing system whether the data item is coercible into the data type and generates for each determined data type a count data element for the corresponding data type and the corresponding data field, wherein each count data element specifies the corresponding data type and a count value of 1.

At the second mapping system 1512, for each data field included in the second sub-set of first data set records: for each data item included in the second sub-set, the second mapping system 1512 determines for each data type of the plurality of data types of the data processing system whether the data item is coercible into the data type and generates for each determined data type a count data element for the corresponding data type and the corresponding data field, wherein each count data element specifies the corresponding data type and a count value of 1.

In some implementations, each count data element specifies the corresponding data field.

In some implementations, each count data element specifies a data field, a data type, and a count value (e.g., {<field ID>, <data type ID>, <count value>}).

In some implementations, the first mapping system 1511 provides the count data elements generated by the first mapping system 1511 to at least one reducing system of the cluster 1500 via the framework system 1501, and the second mapping system 1512 provides the count data elements generated by the second mapping system 1512 to at least one reducing system via the framework system 1501.

Providing Data Items of a Same Data Field to a Same Mapping System

In some implementations, the data processing system provides data items (of the first data set provided by the external data provider system) of a same data field to a same mapping system (e.g., 1511) by using the framework system 1501. For each field of the received data items, each mapping system determines for each received data item (of the field), each data type into which of the data item can be coerced. The mapping system generates a count data element for each data type into which the data item of a field can be coerced. Each count data element specifies the corresponding data type and a count value of 1. In some implementations, each count data element specifies the corresponding data field. Each mapping system provides the count data elements generated by the mapping system to at least one reducing system of the cluster 1500 via the framework system 1501.

Shuffling Process

In some implementations, the framework system 1501 provides at least a first set of count data elements to a first reducing system (e.g., 1521) and provides at least a second set of count data elements to a second reducing system (e.g., 1522).

In some implementations, the framework system 1501 distributes a generated count data element to one of a plurality of reducing systems (e.g., 1521-1523) based on the corresponding data field. In some implementations, the data field is the key of a MapReduce shuffling process performed by the cluster 1500, and the framework system 1501 distributes a generated count data element to one of a plurality of reducing systems (e.g., 1521-1523) based on the corresponding data field.

In some implementations, the framework system 1501 distributes a generated count data element to one of a plurality of reducing systems (e.g., 1521-1523) based on the corresponding data field and data type. In some implementations, the (data field, data type) pair is the key of a MapReduce shuffling process performed by the cluster 1500, and the framework system 1501 distributes a generated count data element to one of a plurality of reducing systems (e.g., 1521-1523) based on the corresponding data field and data type.

In some implementations, the framework system 1501 distributes all generated count data elements of a same data field to a same reducing system. In some implementations, the framework system 1501 distributes all generated count data elements of a same data field and a same data type to a same reducing system.

Reducing Process

In some implementations, at each reducing system that receives the generated count data elements provided by the framework system 1501 (e.g., reducing systems 1521-1523), for each data field: for each data type of the generated count data elements, the reducing system determines a coercion sum of count values for the generated count data elements for the data type, each sum representing a number of data items of the data field that are coercible into the data type.

For each data type that has a coercion sum that satisfies a threshold value, the data processing system sets the data type coercion value for the data type in the data field ordered list of the data field to a value that indicates that data items of the data field are coercible into the data type.

Performing Aggregation by Using Mapping Systems

In some implementations, rather than the first mapping system 1511 and the second mapping system providing count data elements to at least one reducing system of the cluster 1500 via the framework system 1501, the first mapping system 1511 and the second mapping system 1512 determine coercion sums of count values of the count data elements and provide the coercion sums to the at least one reducing system via the framework system 1501.

In some implementations, the framework system 1501 distributes a coercion sum generated by a mapping system to one of a plurality of reducing systems (e.g., 1521-1523) based on the corresponding data field. In some implementations, the framework system 1501 distributes a coercion sum to one of a plurality of reducing systems (e.g., 1521-1523) based on the corresponding data field and data type. In some implementations, the framework system 1501 distributes all coercion sum of a same data field to a same reducing system. In some implementations, the framework system 1501 distributes all coercion sums of a same data field and a same data type to a same reducing system.

In some implementations, at each reducing system that receives the generated count data elements provided by the framework system 1501 (e.g., reducing systems 1521-1523), the reducing system determines at least one total coercion sum. More specifically, for each data field of the received coercion sums, the reducing system determines for each data type of the received coercion sums a total coercion sum. The reducing system determines each total coercion sum by adding each coercion sum for the data type and data field. Each total coercion sum represents a total number of data items of the data field that are coercible into the data type. For each data type that has a total coercion sum that satisfies a threshold value, the data processing system sets the data type coercion value for the data type in the data field ordered list of the data field to a value that indicates that data items of the data field are coercible into the data type.

Multi-Tiered Reducing Process

In some implementations, the framework system 1501 distributes generated count data elements of a same data field to a plurality of reducing systems during a first tier of a multi-tiered reducing process.

In some implementations, each reducing system receiving the generated count data elements determines that a first tier reducing process is to be performed because the count value of each count data element is 1.

During the first tier of the multi-tiered reducing process, at each reducing system that receives the generated count data elements provided by the framework system 1501 (e.g., reducing systems 1521-1523), for each data field: for each data type of the generated count data elements, the reducing system determines a coercion sum of count values for the generated count data elements for the data type, each sum representing a number of data items of the data field that are coercible into the data type. For each determined coercion sum, the reducing system generates a reducer count data element for the corresponding data type that specifies the corresponding data type and a count value equal to the determined coercion sum. The reducing system provides each reducer count data element to the framework system 1501, and the data processing system initiates the second tier of the multi-tiered reducing process.

In some implementations, during the second tier of the multi-tiered reducing process, the data processing system provides reducer count data elements of each reducer system to a respective identify mapping system by using the framework system 1501. Each identity mapping system performs an identity mapping process by providing the received reducer count data elements to the framework system 1501 without modifying the reducer count data elements.

In some implementations, the framework system 1501 distributes a reducer count data element to one of a plurality of reducing systems (e.g., 1521-1523) based on the corresponding data field. In some implementations, the framework system 1501 distributes a reducer count data element to one of a plurality of reducing systems (e.g., 1521-1523) based on the corresponding data field and data type. In some implementations, the framework system 1501 distributes all reducer count data elements of a same data field to a same reducing system. In some implementations, the framework system 1501 distributes all reducer count data elements of a same data field and a same data type to a same reducing system.

In some implementations, each reducing system receiving the reduced count data elements determines that a second tier reducing process is to be performed because the count value of at least one received count data element is greater than 1.

During the second tier of the multi-tiered reducing process, at each reducing system that receives the reducer count data elements provided by the framework system 1501 (e.g., reducing systems 1521-1523), for each data field: for each data type of the reducer count data elements, the reducing system determines a total coercion sum of count values for the reducer count data elements for the data type, each total sum representing a number of data items of the data field that are coercible into the data type, and for each data type that has a total coercion sum that satisfies a threshold value, the data processing system sets the data type coercion value for the data type in the data field ordered list of the data field to a value that indicates that data items of the data field are coercible into the data type.

In some implementations, a reducing system determines whether to perform first tier or second tier reducing processing based on the count value of each count data element. In some implementations, a count value of 1 indicates that the reducing system should perform first tier reducing processing, whereas a count value greater than one indicates that the reducing system should perform second tier reducing processing.

In some implementations, a reducing system determines to perform first tier reducing processing in a case where each count data element has a count value of 1. In some implementations, a reducing system determines to perform second tier reducing processing in a case where at least one count data element has a count value greater than 1.

Multi-Tiered Mapping Process

In some implementations, the framework system 1501 sorts count data elements provided by each mapping system independently, and provides sorted count data elements generated by a given mapping system to the same mapping system. With respect to FIG. 15, the framework system 1501 sorts count data elements generated by the mapping system 1511 and provides the sorted count data elements of mapping system 1511 to the mapping system 1511. For each data field: for each data type of the sorted count data elements provided by the framework system 1501, the mapping system 1511 determines a coercion sum of count values for the sorted count data elements for the data type, each sum representing a number of data items of the data field that are coercible into the data type. For each determined coercion sum, the mapping system 1511 generates a second tier count data element for the corresponding data type that specifies the corresponding data type and a count value equal to the determined coercion sum. The mapping system 1511 provides each second tier count data element to the framework system 1501.

Similarly, the framework system 1501 sorts count data elements generated by the mapping system 1512 and provides the sorted count data elements of mapping system 1512 to the mapping system 1512. For each data field: for each data type of the sorted count data elements provided by the framework system 1501, the mapping system 1512 determines a coercion sum of count values for the sorted count data elements for the data type, each sum representing a number of data items of the data field that are coercible into the data type. For each determined coercion sum, the mapping system 1512 generates a second tier count data element for the corresponding data type that specifies the corresponding data type and a count value equal to the determined coercion sum. The mapping system 1512 provides each second tier count data element to the framework system 1501.

In some implementations, the framework system 1501 provides at least a first set of second tier count data elements to a first reducing system (e.g., 1521) and provides at least a second set of second tier count data elements to a second reducing system (e.g., 1522).

In some implementations, the framework system 1501 distributes a generated second tier count data element to one of a plurality of reducing systems (e.g., 1521-1523) based on the corresponding data field. In some implementations, the data field is the key of a MapReduce shuffling process performed by the cluster 1500, and the framework system 1501 distributes a generated second tier count data element to one of a plurality of reducing systems (e.g., 1521-1523) based on the corresponding data field.

In some implementations, the framework system 1501 distributes a generated second tier count data element to one of a plurality of reducing systems (e.g., 1521-1523) based on the corresponding data field and data type. In some implementations, the (data field, data type) pair is the key of a MapReduce shuffling process performed by the cluster 1500, and the framework system 1501 distributes a generated second tier count data element to one of a plurality of reducing systems (e.g., 1521-1523) based on the corresponding data field and data type.

In some implementations, the framework system 1501 distributes all generated second tier count data elements of a same data field to a same reducing system. In some implementations, the framework system 1501 distributes all generated second tier count data elements of a same data field and a same data type to a same reducing system.

In some implementations, at each reducing system that receives the generated second tier count data elements provided by the framework system 1501 (e.g., reducing systems 1521-1523), for each data field: for each data type of the generated second tier count data elements, the reducing system determines a coercion sum of count values for the generated second tier count data elements for the data type, each sum representing a number of data items of the data field that are coercible into the data type.

For each data type that has a coercion sum that satisfies a threshold value, the data processing system sets the data type coercion value for the data type in the data field ordered list of the data field to a value that indicates that data items of the data field are coercible into the data type.

Satisfying the Threshold Value

In some implementations, the data processing determines that a coercion sum for a data field satisfies a threshold value responsive to a determination that the coercion sum is greater than the threshold value.

In some implementations, the data processing determines that a coercion sum for a data field satisfies a threshold value responsive to a determination that a ratio of the coercion sum to an existence sum for the data field is greater than the threshold value.

In some implementations, the existence sum for a data field indicates a number of data items of the data field included in the first data set provided by the external data provider system. In some implementations, the data processing system determines an existence sum for a data field by using the DSDP cluster 1500. In some implementations, each mapping system that generates count data elements generates an existence data element for each data field included in the first sub-set of first data set records responsive to identifying a data item of the data field. In some implementations, each existence data element specifies a count value of 1. In some implementations, each existence data element specifies a data field, an existence marker, and a count value (e.g., {<field ID>, <Existence Marker>, <count value>}). In some implementations, the DSDP cluster 1500 generates a sum of count values of the existence data elements generated for a data field by using the same process described herein for determining a sum of count values of count data elements of a data type generated for a data field. More specifically, at each mapping system that generates count data elements, for each data field included in the respective sub-set of first data set records: for each data item included in the sub-set, the mapping system generates an existence data element for the corresponding data field, and each existence data element specifies a count value of 1. Each such mapping system provides the existence data elements generated by the mapping system to the framework system 1501 which provides the existence data elements to at least one reducing system. In some implementations, the framework system 1501 provides all existence data elements to a single reducer system. In some implementations, the framework system 1501 distributes an existence data element to one of a plurality of reducing systems (e.g., 1521-1523) based on the corresponding data field. In some implementations, the framework system 1501 distributes all existence data element of a same data field to a same reducing system.

Computer Architecture

Figure 10:
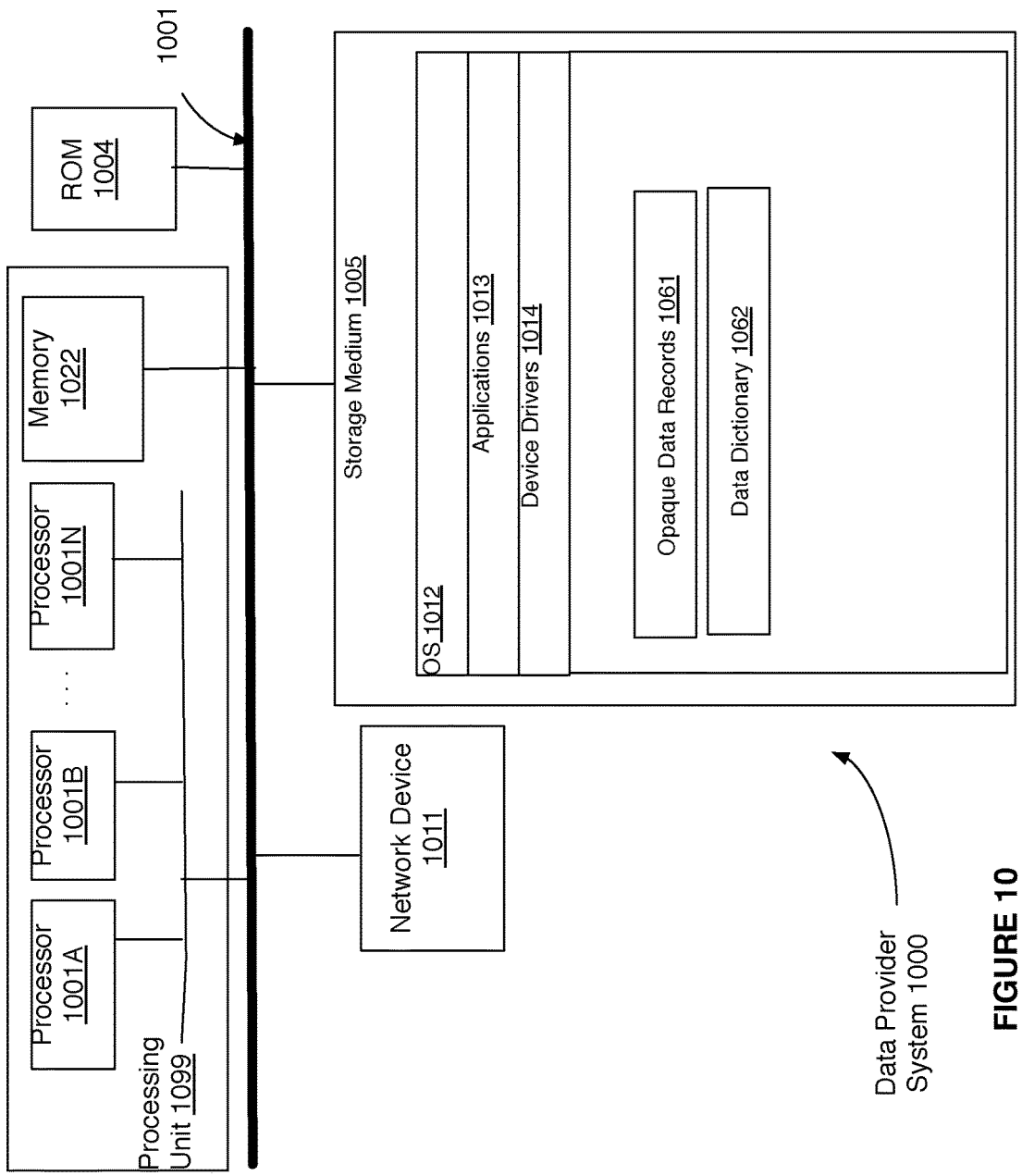
FIG. 10 is an architecture diagram of a data provider system in accordance with embodiments.
Figure 11:
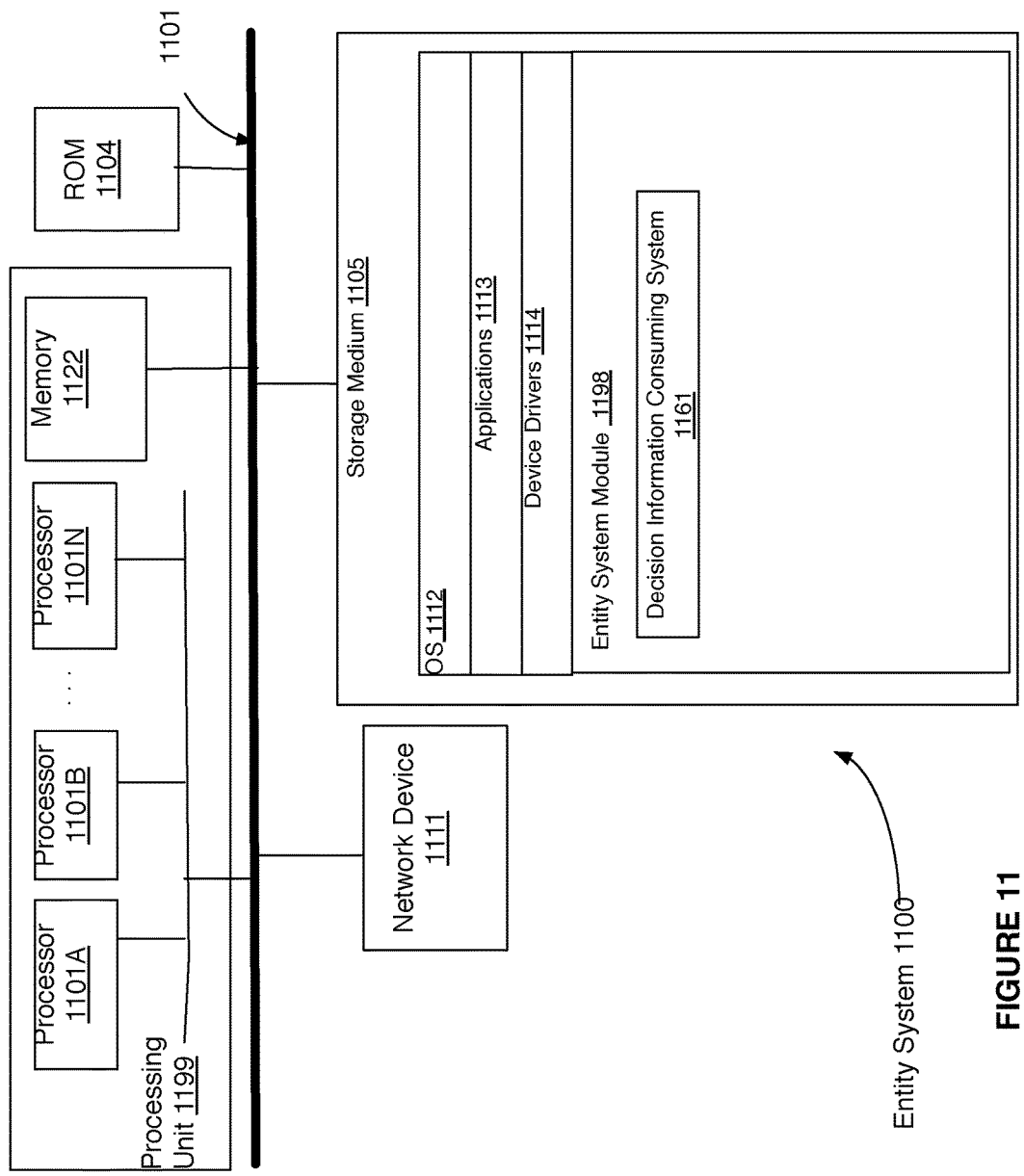
FIG. 11 is an architecture diagram of an entity system in accordance with embodiments.

FIG. 9 is an architecture diagram of a data processing system (e.g., 100a-100d) in accordance with embodiments. In some embodiments, the data processing system of FIG. 9 is a decisioning system. FIG. 10 is an architecture diagram of a data provider system (e.g., 131-136) in accordance with embodiments. FIG. 11 is an architecture diagram of an entity system (e.g., 151b-153b, 151c, 151d-153d) in accordance with embodiments. FIG. 16 is an architecture diagram of a hardware server device (DSDP cluster node) of a DSDP cluster in accordance with embodiments.

FIG. 9

FIG. 9 is an architecture diagram of a data processing system (e.g., 100a-100d) in accordance with embodiments. In some embodiments, the data processing system is a decisioning system (e.g., 100a-100d). In some embodiments, the decisioning system is implemented as a single hardware server device 900. In some embodiments, the decisioning system is implemented as a plurality of hardware devices similar to the hardware server device 900 of FIG. 9. In some embodiments, the decisioning system is implemented as a plurality of hardware devices including at least one hardware device similar to the hardware server device 900 of FIG. 9, and at least one hardware device similar to the hardware server device 1600 of FIG. 16.

The hardware server device 900 includes a bus 901 that interfaces with the processors 901A-901N, the main memory (e.g., a random access memory (RAM)) 922, a read only memory (ROM) 904, a processor-readable storage medium 905, and a network device 911. In some implementations, the hardware server device 900 includes at least one of a display device and a user input device. In some implementations, the device 900 includes one processor (e.g., 901A).

The processors 901A-901N may take many forms, such as one or more of an ARM processor, an X86 processor, a GPU (Graphics Processing Unit), and the like. In some embodiments, at least one of the processors 901A-901N includes at least one arithmetic logic unit (ALU) that supports a SIMD (Single Instruction Multiple Data) system that provides native support for multiply and accumulate operations.

In some implementations, the hardware server device 900 includes at least one of a central processing unit (processor), a GPU, and a multi-processor unit (MPU).

The processors 901A-901N and the main memory 922 form a processing unit 999. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a decisioning system module, a data pre-processing module, a decisioning engine, and a modeling client system. In some embodiments, the processing unit includes one or more of a mapping system, a reducing system, and a framework system of the cluster 1500.

In some embodiments, the processing unit 999 includes at least one arithmetic logic unit (ALU) that supports a SIMD (Single Instruction Multiple Data) system that provides native support for multiply and accumulate operations.

The network adapter device 911 provides one or more wired or wireless interfaces for exchanging data and commands between the device 900 and other devices, such as a DSDP cluster node (e.g., 1600 of FIG. 16). In some implementations, the network adapter device 911 provides one or more wired or wireless interfaces for exchanging data and commands between the device 900 and other devices, such a hardware data provider system (e.g., 131-136), an entity system (e.g., 151b-153b, 151c, 151d-153d). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 922 (of the processing unit 999) from the processor-readable storage medium 905, the ROM 904 or any other storage location. During execution of these software programs, the respective machine-executable instructions are accessed by at least one of processors 901A-901N (of the processing unit 999) via the bus 901, and then executed by at least one of processors 901A-901N. Data used by the software programs are also stored in the memory 922, and such data is accessed by at least one of processors 901A-901N during execution of the machine-executable instructions of the software programs. The processor-readable storage medium 905 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 905 includes machine-executable instructions (and related data) for an operating system 912, software programs 913, device drivers 914, and a decisioning system module 998. In some implementations, the decisioning system module 998 includes one or more of the data pre-processing module 180, the decisioning engine 110, and the modeling client system 141. In some implementations, the decisioning system module 998 includes the data pre-processing module 180, the decisioning engine 110, and the modeling client system 141.

In some implementations, the data pre-processing module 180 includes the type coercion module 112. In some implementations, the data pre-processing module 180 includes a DSDP module of the DSDP cluster 1500 of FIG. 15. In some implementations, the type coercion module 112 includes a DSDP module of the DSDP cluster 1500 of FIG. 15. In some embodiments, the DSDP module includes machine-executable instructions (and related data) for each mapping system (e.g., 1511, 1512) of the DSDP cluster 1500, each reducing system (e.g., 1521-1523) of the cluster 1500, and each framework system (e.g., 1501) of the cluster

FIG. 10

FIG. 10 is an architecture diagram of a data provider system (e.g., 131-136) in accordance with embodiments.

In some embodiments, the data provider system is implemented as a single hardware server device 10000. In some embodiments, the data provider system is implemented as a plurality of hardware devices similar to the hardware server device 1000 of FIG. 10.

The hardware server device 1000 includes a bus 1001 that interfaces with the processors 1001A-1001N, the main memory (e.g., a random access memory (RAM)) 1022, a read only memory (ROM) 1004, a processor-readable storage medium 1005, and a network device 1011. In some implementations, the hardware server device 1000 includes at least one of a display device and a user input device. In some implementations, the device 1000 includes one processor (e.g., 1001A).

The processors 1001A-1001N may take many forms, such as one or more of an ARM processor, an X86 processor, a GPU (Graphics Processing Unit), and the like. In some implementations, the hardware server device 1000 includes at least one of a central processing unit (processor), a GPU, and a multi-processor unit (MPU).

The processors 1001A-1001N and the main memory 1022 form a processing unit 1099. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1011 provides one or more wired or wireless interfaces for exchanging data and commands between the device 1000 and other devices, such as a the decisioning system (e.g., 100a-100d). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1022 (of the processing unit 1099) from the processor-readable storage medium 1005, the ROM 1004 or any other storage location. During execution of these software programs, the respective machine-executable instructions are accessed by at least one of processors 1001A-1001N (of the processing unit 1099) via the bus 1001, and then executed by at least one of processors 1001A-1001N. Data used by the software programs are also stored in the memory 1022, and such data is accessed by at least one of processors 1001A-1101N during execution of the machine-executable instructions of the software programs. The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1005 includes machine-executable instructions (and related data) for an operating system 1012, software programs 1013, and device drivers 1014. In some implementations, the storage medium 1005 includes opaque data records 1061. In some implementations, the storage medium 1005 includes a data dictionary 1062

FIG. 11

FIG. 11 is an architecture diagram of a hardware device 11000 entity system (e.g., 151b-153b, 151c, 151d-153d) in accordance with embodiments.

In some embodiments, the entity system is implemented as a single hardware server device 1100. In some embodiments, the entity system is implemented as a plurality of hardware devices similar to the hardware server device 1100 of FIG. 11.

The hardware server device 1100 includes a bus 1101 that interfaces with the processors 1101A-1101N, the main memory (e.g., a random access memory (RAM)) 1122, a read only memory (ROM) 1104, a processor-readable storage medium 1105, and a network device 1111. In some implementations, the hardware server device 1100 includes at least one of a display device and a user input device. In some implementations, the device 1100 includes one processor (e.g., 1101A).

The processors 1101A-1101N may take many forms, such as one or more of an ARM processor, an X86 processor, a GPU (Graphics Processing Unit), and the like. In some implementations, the hardware server device 1100 includes at least one of a central processing unit (processor), a GPU, and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1111 provides one or more wired or wireless interfaces for exchanging data and commands between the device 1100 and other devices, such as a the decisioning system (e.g., 110a-100d). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1105 includes machine-executable instructions (and related data) for an operating system 1112, software programs 1113, and device drivers 1114. In some implementations, the storage medium 1105 includes machine-executable instructions (and related data) for an entity system module 1198. In some implementations, the entity system module 1198 includes machine-executable instructions (and related data) for a decision information consuming system 1161 (e.g., a consuming system similar to the consuming systems described herein).

FIG. 16

Figure 15:
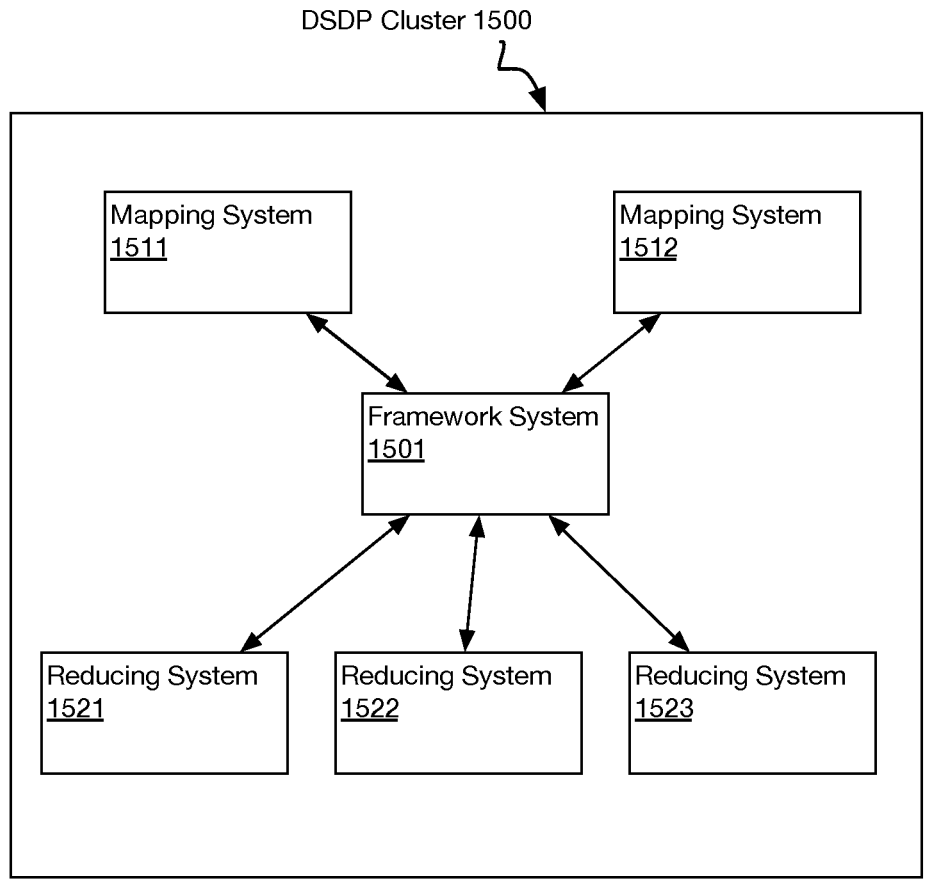
FIG. 15 is a schematic representation of a distributed storage and distributed processing (DSDP) cluster in accordance with embodiments.

FIG. 16 is an architecture diagram of a hardware server device (DSDP cluster node) of the DSDP cluster 1500 of FIG. 15.

The hardware server device 1600 includes a bus 1601 that interfaces with the processors 1601A-1601N, the main memory (e.g., a random access memory (RAM)) 1622, a read only memory (ROM) 1604, a processor-readable storage medium 1605, and a network device 1611. In some implementations, the DSDP node 1600 includes at least one of a display device and a user input device. In some implementations, the device 1600 includes one processor (e.g., 1601A).

The processors 1601A-1601N may take many forms, such as one or more of an ARM processor, an X86 processor, a GPU (Graphics Processing Unit), and the like. In some embodiments, at least one of the processors 1601A-1601N includes at least one arithmetic logic unit (ALU) that supports a SIMD (Single Instruction Multiple Data) system that provides native support for multiply and accumulate operations.

In some implementations, the hardware server device 1600 includes at least one of a central processing unit (processor), a GPU, and a multi-processor unit (MPU).

The processors 1601A-1601N and the main memory 1622 form a processing unit 1699. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of a mapping system, a reducing system, and a framework system of the cluster 1500.

In some embodiments, the processing unit 1699 includes at least one arithmetic logic unit (ALU) that supports a SIMD (Single Instruction Multiple Data) system that provides native support for multiply and accumulate operations.

The network adapter device 1611 provides one or more wired or wireless interfaces for exchanging data and commands between the DSDP cluster node 1600 and other devices, such as other DSDP cluster nodes. In some implementations, the network adapter device 1611 provides one or more wired or wireless interfaces for exchanging data and commands between the DSDP cluster node 1600 and other devices, such a hardware device that includes the type coercion module 112 (e.g., 100 of FIG. 9). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1622 (of the processing unit 1699) from the processor-readable storage medium 1605, the ROM 1604 or any other storage location. During execution of these software programs, the respective machine-executable instructions are accessed by at least one of processors 1601A-1601N (of the processing unit 1699) via the bus 1601, and then executed by at least one of processors 1601A-1601N. Data used by the software programs are also stored in the memory 1622, and such data is accessed by at least one of processors 1601A-1601N during execution of the machine-executable instructions of the software programs. The processor-readable storage medium 1605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1605 includes machine-executable instructions (and related data) for an operating system 1612, software programs 1613, device drivers 1614, and a DSDP module 1620 of the DSDP cluster 1500 of FIG. 15.

In some embodiments, the DSDP module 1620 includes machine-executable instructions (and related data) for each mapping system (e.g., 1511, 1512) of the DSDP cluster 1500, each reducing system (e.g., 1521-1523) of the cluster 1500, and each framework system (e.g., 1501) of the cluster. In some embodiments, the DSDP module 1620 includes machine-executable instructions (and related data) for one or more of: a mapping system (e.g., 1511, 1512) of the DSDP cluster 1500, a reducing system (e.g., 1521-1523) of the cluster 1500, and a framework system (e.g., 1501) of the cluster. In some embodiments, the DSDP module 1620 includes machine-executable instructions (and related data) for at least one identify mapping system of the cluster 1500. In some embodiments, the DSDP module 1620 includes machine-executable instructions (and related data) for a MapReduce cluster node. In some embodiments, the DSDP module 1620 includes machine-executable instructions (and related data) for a mapping system of the cluster 1500 and a framework system of the cluster 1500. In some embodiments, the DSDP module 1620 includes machine-executable instructions (and related data) for a reducing system of the cluster 1500 and a framework system of the cluster 1500.

Machines

The systems and methods of the embodiments and variations thereof can be embodied and/or implemented at least in part as a machine configured to receive a computer-readable medium storing computer-readable instructions. The instructions are preferably executed by computer-executable components preferably integrated with the MSCP. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising: at a data processing system:
   storing a coercion rule for each data field of a first data set provided by an external data provider system, wherein each stored coercion rule identifies at least one data type for the corresponding data field;
   responsive to a second data set provided by the external data provider system, coercing each data item of the second data set into at least one data type specified by the stored coercion rule for the data field of the data item to generate at least one converted data item of the second data set;
   generating information from at least one converted data item; and
   providing the generated information to a consuming system,
   wherein each stored coercion rule specifies a data type identifier for a default data type for the corresponding data field,
   wherein coercing each data item of the second data set comprises: coercing each data item of the second data set into the default data type specified by the stored coercion rule for the data field of the data item to generate a converted data item of the second data set,
   wherein storing a coercion rule for each data field of the first data set comprises:
   storing a system ordered list of system data type values corresponding to a plurality of data types processed by the data processing system;
   for each data field of the first data set, determining a data field ordered list of data type coercion values for the data field from the first data set, wherein each data type coercion value indicates whether data items of the data field are coercible into a corresponding data type of the plurality of data types of the data processing system;
   for each data field:
      for each data type coercion value of the data field ordered list for the data field, determining a product of the data type coercion value of the data field ordered list and the data type value of the system ordered list that corresponds to the data type coercion value,
      determining a sum of the products determined for the data field ordered list,
      performing a log operation on the determined sum for the data field,
      performing a floor operation on a result of the log operation, the result of the floor operation identifying a list position in the system ordered list,
      selecting a data type identifier corresponding to the data type value of the list position in the system ordered list that is identified by the result of the floor operation, and
      generating a coercion rule for the data field that specifies the selected data type identifier as the default type for the data field and storing the generated coercion rule.

2. The method of claim 1,
   wherein the data type values of the system ordered list have an order that is consistent with coercion relationships among the plurality of data types, and
   wherein the coercion relationships indicate for each pair of data types whether a data item of a first data type of the pair is coercible into a second data type of the pair.

3. The method of claim 2,
   wherein for each list position in the system ordered list, the corresponding data type value is generated by performing an exponentiation operation using an exponent equal to an integer value that represents the list position in the system ordered list, and
   wherein a base of the log operation is equal to a base of the exponentiation operation.

4. The method of claim 3,
   wherein a base of the exponentiation operation is base 2 and wherein the log operation is a base 2 log operation,
   wherein a length of each data field ordered list equals a length of the system ordered list, and
   wherein a data type value of the system ordered list and a data type coercion value of a data field ordered list having a same list position correspond to a same data type of the plurality of data types.

5. The method of claim 4, wherein determining each data field ordered list comprises:
   for each data item of the data field included in the first data set, determining for each data type whether the data item is coercible into the data type and generating a type list that includes a corresponding data type identifier for each determined data type;
   for each data type of the plurality of data types, determining a number of generated type lists that include the data type, and for each data type that has a number that satisfies a threshold value, setting the data type coercion value for the data type in the data field ordered list to a value that indicates that data items of the data field are coercible into the data type.

6. The method of claim 4, wherein the data processing system uses a distributed storage and distributed processing (DSDP) cluster to determine each data field ordered list, wherein the DSDP cluster includes at least a first mapping system, a second mapping system, a DSDP framework system, and at least one reducing system, and wherein each mapping system includes one of a virtual machine and a hardware machine, wherein each reducing system includes one of a virtual machine and a hardware machine, and wherein the framework system includes one of a virtual machine and a hardware machine.

7. The method of claim 6, the method further comprising:
   the data processing system providing a first sub-set of first data set records of the first data set provided by the external data provider system to the first mapping system by using the framework system;
   the data processing system providing a second sub-set of first data set records of the first data set provided by the external data provider system to the second mapping system by using the framework system;
   at the first mapping system:
      for each data field included in the first sub-set of first data set records: for each data item included in the first sub-set, determining for each data type of the plurality of data types of the data processing system whether the data item is coercible into the data type and generating for each determined data type a count data element for the corresponding data type and the corresponding data field, wherein each count data element specifies the corresponding data type and a count value of 1;
   at the second mapping system:
      for each data field included in the second sub-set of first data set records: for each data item included in the second sub-set, determining for each data type of the plurality of data types of the data processing system whether the data item is coercible into the data type and generating for each determined data type a count data element for the corresponding data type and the corresponding data field, wherein each count data element specifies the corresponding data type and a count value of 1.

8. The method of claim 7, the method further comprising:
the first mapping system providing the count data elements generated by the first mapping system to at least one reducing system of the cluster via the framework system;
the second mapping system providing the count data elements generated by the second mapping system to the at least one reducing system via the framework system
at the at least one reducing system:
for each data field: for each data type of the generated count data elements, determining a coercion sum of count values for the generated count data elements for the data type, wherein each sum represents a number of data items of the data field that are coercible into the data type, wherein for each data type that has a coercion sum that satisfies a threshold value, the data processing system sets the data type coercion value for the data type in the data field ordered list of the data field to a value that indicates that data items of the data field are coercible into the data type.

9. The method of claim 8, the method further comprising:
at the first mapping system:
for each data field included in the first sub-set of first data set records: for each data item included in the first sub-set, generating an existence data element for the corresponding data field, wherein each existence data element specifies a count value of 1;
at the second mapping system:
for each data field included in the second sub-set of first data set records: for each data item included in the second sub-set, generating an existence data element for the corresponding data field, wherein each existence data element specifies a count value of 1;
the first mapping system providing the existence data elements generated by the first mapping system to the at least one reducing system via the framework system;
the second mapping system providing the existence data elements generated by the second mapping system to the at least one reducing system via the framework system;
at the at least one reducing system:
for each data field: determining a existence sum of count values for the generated existence data elements, wherein each sum indicates a number of first data records that include data items of the respective data field,
wherein for each data type of a respective data field, determining whether a respective sum satisfies the threshold value comprises determining whether a ratio of the coercion sum to the existence sum for the data field is greater than the threshold value.

10. The method of claim 7, the method further comprising:
at the first mapping system:
for each data field: for each data type of the generated count data elements generated by the first mapping system, determining a coercion sum of count values for the generated count data elements for the data type, wherein each coercion sum represents a number of data items of the data field that are coercible into the data type
providing each coercion sum generated by the first mapping system to at least one reducing system of the cluster via the framework system;
at the second mapping system:
for each data field: for each data type of the generated count data elements generated by the second mapping system, determining a coercion sum of count values for the generated count data elements for the data type, wherein each coercion sum represents a number of data items of the data field that are coercible into the data type;
providing each coercion sum generated by the second mapping system to at least one reducing system of the cluster via the framework system
at the at least one reducing system:
for each data field: for each data type of the coercion sums received from the first mapping system and the second mapping system, determining a total coercion sum by adding each coercion sum for the data type and the data field, wherein each total coercion sum represents a total number of data items of the data field that are coercible into the data type, wherein for each data type that has a total coercion sum that satisfies a threshold value, the data processing system sets the data type coercion value for the data type in the data field ordered list of the data field to a value that indicates that data items of the data field are coercible into the data type.

11. The method of claim 9,
wherein the cluster includes a plurality of reducing systems,
wherein the framework system provides at least a first set of count data elements to a first reducing system and a second set of count data elements to a second reducing system,
wherein the framework system provides all count data elements of a same data field to a same reducing system,
wherein at each reducing system and for each field of the received count data elements, the reducing system determines a coercion sum for each data type of the received count data elements, each coercion sum representing a number of data items of the data field that are coercible into the data type.

12. The method of claim 9,
wherein the cluster includes a plurality of reducing systems,
wherein the framework system provides at least a first set of count data elements to a first reducing system and a second set of count data elements to a second reducing system, and
wherein all count data elements of a same data type of a same data field are provided to a same reducing system,
wherein at each reducing system and for each field of the received count data elements, the reducing system determines a coercion sum for each data type of the received count data elements, each coercion sum representing a number of data items of the data field that are coercible into the data type.

13. The method of claim 6,
for each data field of first data set provided by the external data provider system, the data processing system provides data items of the data field to a respective mapping system of the cluster by using the framework system;

at each mapping system:
for each received data item of the respective data field, determining for each data type of the plurality of data types of the data processing system whether the data item is coercible into the data type and generating for each determined data type a count data element for the corresponding data type and the corresponding data field, wherein each count data element specifies the corresponding data type and a count value of 1; and providing the count data elements generated by the mapping system to at least one reducing system via the framework system;

at the at least one reducing system:
for each data field: for each data type of the generated count data elements, determining a coercion sum of count values for the generated count data elements for the data type, wherein each sum represents a number of data items of the data field that are coercible into the data type, wherein for each data type that has a coercion sum that satisfies a threshold value, the data processing system sets the data type coercion value for the data type in the data field ordered list of the data field to a value that indicates that data items of the data field are coercible into the data type.

14. The method of claim 13,
wherein the cluster includes a plurality of reducing systems,
wherein the framework system provides at least a first set of count data elements to a first reducing system and a second set of count data elements to a second reducing system, and
wherein all count data elements of a same data type and same data field are provided to a same reducing system, wherein at each reducing system and for each field of the received count data elements, the reducing system determines a coercion sum for each data type of the received count data elements, each coercion sum representing a number of data items of the data field that are coercible into the data type.

15. The method of claim 1, wherein the data processing system determines each product and determines each sum by using at least one of arithmetic operations and bitwise logical operations of at least one arithmetic logic unit (ALU) of the data processing system that supports a SIMD (Single Instruction Multiple Data) system that provides native support for multiply and accumulate operations.

16. The method of claim 1, wherein the data processing system determines whether a data item of a data field is coercible into a corresponding data type by converting the data item into the corresponding data type and determining whether the converted data item is a valid data item, wherein in a case where the converted data item is a valid data item, the data item is coercible into the data type.

17. The method of claim 16, wherein the data processing system converts each data item by performing a type casting operation.

18. The method of claim 8,
wherein the cluster includes a plurality of reducing systems,
wherein the framework system provides at least a first set of count data elements to a first reducing system and a second set of count data elements to a second reducing system,
wherein count data elements of a same data type of a same data field are provided to a plurality of reducing systems,
wherein at each reducing system and for each field of the received count data elements, the reducing system:
determines a coercion sum for each data type of the received count data elements, each coercion sum representing a number of data items of the data field that are coercible into the data type, and
provides each determined coercion sum to a respective identity mapping system of the cluster, the identity mapping system providing each received coercion sum to at least one reducing system via the framework system,
wherein at the at least one reducing system, for each data field and for each data type of the coercion sums received from the identify mapping systems, determining a total coercion sum by adding each coercion sum for the data type and the data field, wherein each total coercion sum represents a total number of data items of the data field that are coercible into the data type, wherein for each data type that has a total coercion sum that satisfies a threshold value, the data processing system sets the data type coercion value for the data type in the data field ordered list of the data field to a value that indicates that data items of the data field are coercible into the data type.

19. The method of claim 13,
wherein the cluster includes a plurality of reducing systems,
wherein the framework system provides at least a first set of count data elements to a first reducing system and a second set of count data elements to a second reducing system,
wherein count data elements of a same data type of a same data field are provided to a plurality of reducing systems,
wherein at each reducing system and for each field of the received count data elements, the reducing system:
determines a coercion sum for each data type of the received count data elements, each coercion sum representing a number of data items of the data field that are coercible into the data type, and
provides each determined coercion sum to a respective identity mapping system of the cluster, the identity mapping system providing each received coercion sum to at least one reducing system via the framework system,
wherein at the at least one reducing system, for each data field and for each data type of the coercion sums received from the identify mapping systems, determining a total coercion sum by adding each coercion sum for the data type and the data field,
wherein each total coercion sum represents a total number of data items of the data field that are coercible into the data type, wherein for each data type that has a total coercion sum that satisfies a threshold value, the data processing system sets the data type coercion value for the data type in the data field ordered list of the data field to a value that indicates that data items of the data field are coercible into the data type.

20. The method of claim 2, wherein the data type values of the system ordered list are ordered in accordance with increasing strength of the corresponding data type, wherein a first data type is stronger than a second data type if the first data type is coercible into the second data type.

21. The method of claim 1, wherein the data processing system determines each product and determines each sum by using at least one of arithmetic operations and bitwise logical operations of at least one arithmetic logic unit (ALU) of the data processing system that supports a SIMD (Single Instruction Multiple Data) system that provides native support for multiply and accumulate operations.

22. The method of claim 1, wherein the first data set is a training data set and wherein the second data set is an input data set, and wherein the data processing system is a decisioning system, and wherein the information is decisioning information.

23. A data processing system system comprising:
  at least one processing unit constructed to execute machine-executable instructions of at least one storage medium of the data processing system; and
  the at least one storage medium, wherein the at least one storage medium stores machine-executable instructions for controlling the data processing system to:
    store a coercion rule for each data field of a first data set provided by an external data provider system, wherein each stored coercion rule identifies at least one data type for the corresponding data field;
    responsive to a second data set provided by the external data provider system, coerce each data item of the second data set into at least one data type specified by the stored coercion rule for the data field of the data item to generate at least one converted data item of the second data set;
    generate information from at least one converted data item; and
    provide the generated information to a consuming system,
  wherein each stored coercion rule specifies a data type identifier for a default data type for the corresponding data field,
  wherein the data processing system is constructed to coerce each data item of the second data set into the default data type specified by the stored coercion rule for the data field of the data item to generate the at least one converted data item of the second data set,
  wherein the data processing system is constructed to store a coercion rule for each data field of the first data set by:
    storing a system ordered list of system data type values corresponding to a plurality of data types processed by the data processing system;
  for each data field of the first data set, determining a data field ordered list of data type coercion values for the data field from the first data set, wherein each data type coercion value indicates whether data items of the data field are coercible into a corresponding data type of the plurality of data types of the data processing system;
  for each data field:
    for each data type coercion value of the data field ordered list for the data field, determining a product of the data type coercion value of the data field ordered list and the data type value of the system ordered list that corresponds to the data type coercion value,
    determining a sum of the products determined for the data field ordered list,
    performing a log operation on the determined sum for the data field,
    performing a floor operation on a result of the log operation, the result of the floor operation identifying a list position in the system ordered list,
    selecting a data type identifier corresponding to the data type value of the list position in the system ordered list that is identified by the result of the floor operation, and
    generating a coercion rule for the data field that specifies the selected data type identifier as the default type for the data field and storing the generated coercion rule.

* * * * *